US012116496B2

United States Patent
Fujii et al.

(10) Patent No.: US 12,116,496 B2
(45) Date of Patent: Oct. 15, 2024

(54) PRETREATMENT LIQUID FOR IMPERMEABLE MEDIUM, BASE MATERIAL FOR IMAGE RECORDING, METHOD OF PRODUCING BASE MATERIAL FOR IMAGE RECORDING, IMAGE RECORDING METHOD, AND INK SET

(71) Applicant: FUJIFILM Corporation, Tokyo (JP)

(72) Inventors: Yusuke Fujii, Kanagawa (JP); Ayato Sato, Kanagawa (JP); Takeshi Miyato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1010 days.

(21) Appl. No.: 17/093,655

(22) Filed: Nov. 10, 2020

(65) Prior Publication Data

US 2021/0054223 A1 Feb. 25, 2021

Related U.S. Application Data

(63) Continuation of application No. PCT/JP2019/018919, filed on May 13, 2019.

(30) Foreign Application Priority Data

Jun. 5, 2018 (JP) .................. 2018-108055

(51) Int. Cl.
*C09D 11/00* (2014.01)
*B41J 2/015* (2006.01)
(Continued)

(52) U.S. Cl.
CPC .............. *C09D 11/54* (2013.01); *B41J 2/015* (2013.01); *B41M 5/0011* (2013.01); *C09D 11/322* (2013.01); *C09D 11/38* (2013.01)

(58) Field of Classification Search
CPC ....... C09D 11/54; C09D 11/322; C09D 11/38; B41J 2/15; B41M 5/0011
(Continued)

(56) References Cited

U.S. PATENT DOCUMENTS 4,775,594 A 10/1988 Desjarlais
8,118,424 B2 2/2012 Irita
(Continued)

FOREIGN PATENT DOCUMENTS

CN 101531089 9/2009
CN 102574406 7/2012
(Continued)

OTHER PUBLICATIONS

"International Search Report (Form PCT/ISA/210) of PCT/JP2019/018919," mailed on Aug. 6, 2019, with English translation thereof, pp. 1-5.
(Continued)

*Primary Examiner* — James E McDonough
(74) *Attorney, Agent, or Firm* — JCIPRNET

(57) ABSTRACT

A pretreatment liquid for an impermeable medium is a pretreatment liquid including water, a resin, and an organic acid, in which a ratio of a content of the resin to a content of the organic acid is greater than 0 and less than 4 on a mass basis, and the organic acid is a compound represented by Formula 1. In Formula 1, l represents 1 or greater, m represents 0 or 1, n represents 1 or greater, and l+m+n is 2 or greater. $R_1$, $R_2$, $R_3$, and $R_4$ each independently represent a hydrogen atom, a hydroxyl group, a carboxy group, an amino group, or an alkyl group having 1 to 4 carbon atoms.

(Continued)

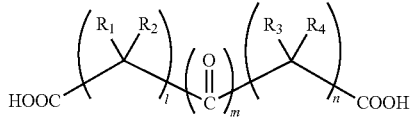

Formula 1

20 Claims, 3 Drawing Sheets

(51) Int. Cl.
 *B41M 5/00* (2006.01)
 *C09D 11/322* (2014.01)
 *C09D 11/38* (2014.01)
 *C09D 11/54* (2014.01)
(58) Field of Classification Search
 USPC .............................. 106/31.01, 31.13, 31.86
 See application file for complete search history.

(56) References Cited

U.S. PATENT DOCUMENTS

| | | | |
|---|---|---|---|
| 8,696,103 | B2 | 4/2014 | Tsuji et al. |
| 8,814,340 | B2 | 8/2014 | Goto |
| 10,501,654 | B2 | 12/2019 | Okamoto et al. |
| 2004/0252169 | A1 | 12/2004 | Chen et al. |
| 2006/0092251 | A1 | 5/2006 | Prasad et al. |
| 2008/0117273 | A1 | 5/2008 | Yamashita et al. |
| 2011/0057993 | A1 | 3/2011 | Yamashita et al. |
| 2012/0098883 | A1 | 4/2012 | Matsuyama et al. |
| 2012/0127251 | A1 | 5/2012 | Tsuji et al. |
| 2012/0320123 | A1 | 12/2012 | Takeda et al. |
| 2015/0166819 | A1 | 6/2015 | Shinohara |
| 2017/0349774 | A1 | 12/2017 | Shimono et al. |
| 2020/0317944 | A1 | 10/2020 | Fukagawa et al. |

FOREIGN PATENT DOCUMENTS

| | | | | |
|---|---|---|---|---|
| CN | 107429096 | | 12/2017 | |
| CN | 111526994 | | 8/2020 | |
| EP | 3050930 | | 8/2016 | |
| EP | 3424714 | | 1/2019 | |
| EP | 3693180 | | 8/2020 | |
| JP | 2005001387 | | 1/2005 | |
| JP | 2008126413 | | 6/2008 | |
| JP | 2008519138 | | 6/2008 | |
| JP | 2009137055 | | 6/2009 | |
| JP | 2010023339 | | 2/2010 | |
| JP | 2011026564 | | 2/2011 | |
| JP | 2011079304 | | 4/2011 | |
| JP | 2012126123 | | 7/2012 | |
| JP | 2013001854 | | 1/2013 | |
| JP | 2014073672 | | 4/2014 | |
| JP | 2017065117 | | 4/2017 | |
| JP | 2017114934 | | 6/2017 | |
| JP | 2017128117 | | 7/2017 | |
| JP | 2018035270 | A * | 3/2018 | .......... B41M 5/0023 |
| JP | 2018035294 | | 3/2018 | |
| JP | 2019014237 | | 1/2019 | |
| WO | 2016136914 | | 9/2016 | |
| WO | 2019131532 | | 7/2019 | |

OTHER PUBLICATIONS

"Written Opinion of the International Searching Authority (Form PCT/ISA/237) of PCT/JP2019/018919," mailed on Aug. 6, 2019, with English translation thereof, pp. 1-12.
"Office Action of China Counterpart Application", issued on Dec. 16, 2021, with English translation thereof, p. 1-p. 19.
"Search Report of Europe Counterpart Application", issued on Jul. 7, 2021, p. 1-p. 10.
"Office Action of China Counterpart Application" with English translation thereof, issued on Jul. 16, 2021, p. 1-p. 27.
"Office Action of Japan Counterpart Application" with English translation thereof, issued on Oct. 26, 2021, p. 1-p. 7.
"Office action of Europe Counterpart Application", issued on Apr. 5, 2023, pp. 1-6.
Diversified Enterprises, "Critical Surface Tension and Contact Angle with Water for Various Polymers", retrieved on Mar. 28, 2023, https://www.accudynetest.com/polytable_03.html?sortby=contact_angle.

* cited by examiner

2pt

3pt

4pt

5pt 2 mm

PRETREATMENT LIQUID FOR IMPERMEABLE MEDIUM, BASE MATERIAL FOR IMAGE RECORDING, METHOD OF PRODUCING BASE MATERIAL FOR IMAGE RECORDING, IMAGE RECORDING METHOD, AND INK SET

CROSS-REFERENCE TO RELATED APPLICATIONS

This application is a Continuation of PCT International Application No. PCT/JP2019/018919 filed on May 13, 2019, which claims priority under 35 U.S.C. § 119(a) to Japanese Patent Application No. 2018-108055 filed on Jun. 5, 2018. Each of the above application(s) is hereby expressly incorporated by reference, in its entirety, into the present application.

BACKGROUND OF THE INVENTION

1. Field of the Invention

The present disclosure relates to a pretreatment liquid for an impermeable medium, a base material for image recording, a method of producing a base material for image recording, an image recording method, and an ink set.

2. Description of the Related Art

As an image recording method for recording an image, various methods have recently been suggested.

For example, a recording method carried out using an ink jet method has been widely used due to the reason that high-quality images can be recorded on a wide variety of base materials by jetting an ink in the form of liquid droplets from nozzles provided in an ink jet head.

Various forms of image recording methods carried out using an ink jet method have been suggested.

For example, a method of using an ink set formed by combining an ink that contains water and a colorant with a pretreatment liquid that contains an aggregating agent that allows components in the ink to be aggregated. According to this method, for example, an image having an excellent resolution can be recorded by bringing the ink and the pretreatment liquid into contact with each other.

For example, JP2017-128117A discloses a pretreatment liquid used with an aqueous ink jet ink containing at least a pigment, in which the pretreatment liquid contains an inorganic metal salt and/or an organic metal salt and an organic amine in a dissolved state, and a difference in pH between the aqueous ink jet ink and the pretreatment liquid is in a range of 0 to 2.

For example, JP2014-073672A describes a pretreatment liquid containing any of an aqueous resin, colloidal silica, barium sulfate, and titanium oxide, a water-soluble organic solvent, water, and an organic acid (for example, malonic acid).

For example, JP2017-114934A describes a treatment liquid for an ink jet recording ink, containing at least a cationic or nonionic resin having a polyurethane structure, an organic acid that is not neutralized by a base, and water.

For example, JP2017-065117A describes a treatment liquid containing an organic acidic compound, a water-soluble polymer compound, water, and a water-soluble solvent.

SUMMARY OF THE INVENTION

However, in the techniques described in JP2017-128117A, JP2014-073672A, and JP2017-114934A, in a case where the pretreatment liquid is applied to a long impermeable medium, the ink is applied to the surface to which the pretreatment liquid has been applied to record an image, and for example, the impermeable medium (in the present specification, also referred to as an image recording medium) on which the image has been recorded is wound into a roll shape, components (for example, an organic acid) contained in the pretreatment liquid present in a non-image recording area where the ink is not present is transferred to the rear surface of the image recording medium in contact with the image recording surface.

An object to be achieved by an embodiment of the present disclosure is to provide a pretreatment liquid for an impermeable medium, a base material for image recording, and an ink set, which suppress transfer of components contained in the pretreatment liquid to a contact object from an image recording surface and enable a high-resolution image to be obtained.

Further, an object to be achieved by another embodiment of the present disclosure is to provide a method of producing a base material for image recording and an image recording method, which suppress transfer of components contained in the pretreatment liquid to a contact object from an image recording surface and enable a high-resolution image to be obtained.

Specific means for achieving the above-described objects includes the following aspects.

<1> A pretreatment liquid for an impermeable medium, comprising: water; a resin; and an organic acid, in which a ratio of a content of the resin to a content of the organic acid is greater than 0 and less than 4 on a mass basis, and the organic acid is a compound represented by Formula 1.

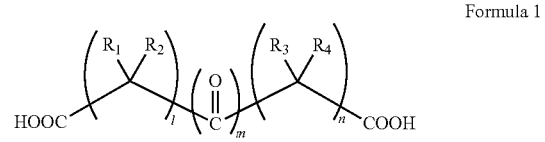

Formula 1

In Formula 1, l represents 1 or greater, m represents 0 or 1, n represents 1 or greater, and l+m+n is 2 or greater. $R_1$ to $R_4$ each independently represent a hydrogen atom, a hydroxyl group, a carboxy group, an amino group, or an alkyl group having 1 to 4 carbon atoms.

<2> The pretreatment liquid for an impermeable medium according to <1>, in which the organic acid is at least one selected from the group consisting of succinic acid, methylsuccinic acid, dimethylsuccinic acid, oxalacetic acid, malic acid, tartaric acid, glutaric acid, citric acid, 1,2,3-propanetricarboxylic acid, 1,3-acetonedicarboxylic acid, methylglutaric acid, dimethylglutaric acid, 2-oxoglutaric acid, adipic acid, butane-1,2,3,4-tetracarboxylic acid, pimelic acid, 1,3,5-pentanetricarboxylic acid, and 4-oxooctanedioic acid.

<3> The pretreatment liquid for an impermeable medium according to <1> or <2>, in which in Formula 1, l+m+n is 3 to 5.

<4> The pretreatment liquid for an impermeable medium according to any one of <1> to <3>, in which m in Formula 1 represents 0, and $R_1$ to $R_4$ represent a hydrogen atom.

<5> The pretreatment liquid for an impermeable medium according to any one of <1> to <4>, in which the organic acid has a pKa of 4.0 to 6.0.

<6> The pretreatment liquid for an impermeable medium according to any one of <1> to <5>, in which the resin has a particulate form.

<7> The pretreatment liquid for an impermeable medium according to any one of <1> to <6>, in which the resin contains an anionic group.

<8> The pretreatment liquid for an impermeable medium according to <7>, in which the anionic group is a sulfonic acid group or a sulfonate.

<9> The pretreatment liquid for an impermeable medium according to any one of <1> to <8>, in which the pretreatment liquid for an impermeable medium has a pH of 2 to 4.

<10> The pretreatment liquid for an impermeable medium according to any one of <1> to <9>, in which the ratio of the content of the resin to the content of the organic acid is less than 2 on a mass basis.

<11> A base material for image recording, comprising: an impermeable medium, in which a resin and an organic acid which is a compound represented by Formula 1 are provided on the impermeable medium, and a ratio of a content of the resin to a content of the organic acid is greater than 0 and less than 4 on a mass basis.

<12> A method of producing a base material for image recording, comprising: a step of applying the pretreatment liquid for an impermeable medium according to any one of <1> to <10> onto an impermeable medium.

<13> An image recording method comprising: a step of applying the pretreatment liquid for an impermeable medium according to any one of <1> to <10> onto an impermeable medium; and a step of allowing an ink composition containing a colorant and water to be jetted, by an ink jet method, onto a surface of the impermeable medium onto which the pretreatment liquid for an impermeable medium has been applied and recording an image.

<14> An image recording method comprising: a step of allowing an ink composition containing a colorant and water to be jetted, by an ink jet method, onto a surface of the base material for image recording according to <11>, which includes the resin and the organic acid, and recording an image.

<15> An ink set comprising: an ink composition containing a colorant and water; and the pretreatment liquid for an impermeable medium according to any one of <1> to <10>.

According to an embodiment of the present disclosure, it is possible to provide a pretreatment liquid for an impermeable medium, a base material for image recording, and an ink set, which suppress transfer of components contained in the pretreatment liquid to a contact object from an image recording surface and enable a high-resolution image to be obtained.

Further, according to another embodiment of the present disclosure, it is possible to provide a method of producing a base material for image recording and an image recording method, which suppress transfer of components contained in the pretreatment liquid to a contact object from an image recording surface and enable a high-resolution image to be obtained.

DESCRIPTION OF THE PREFERRED EMBODIMENTS

Figure 1:
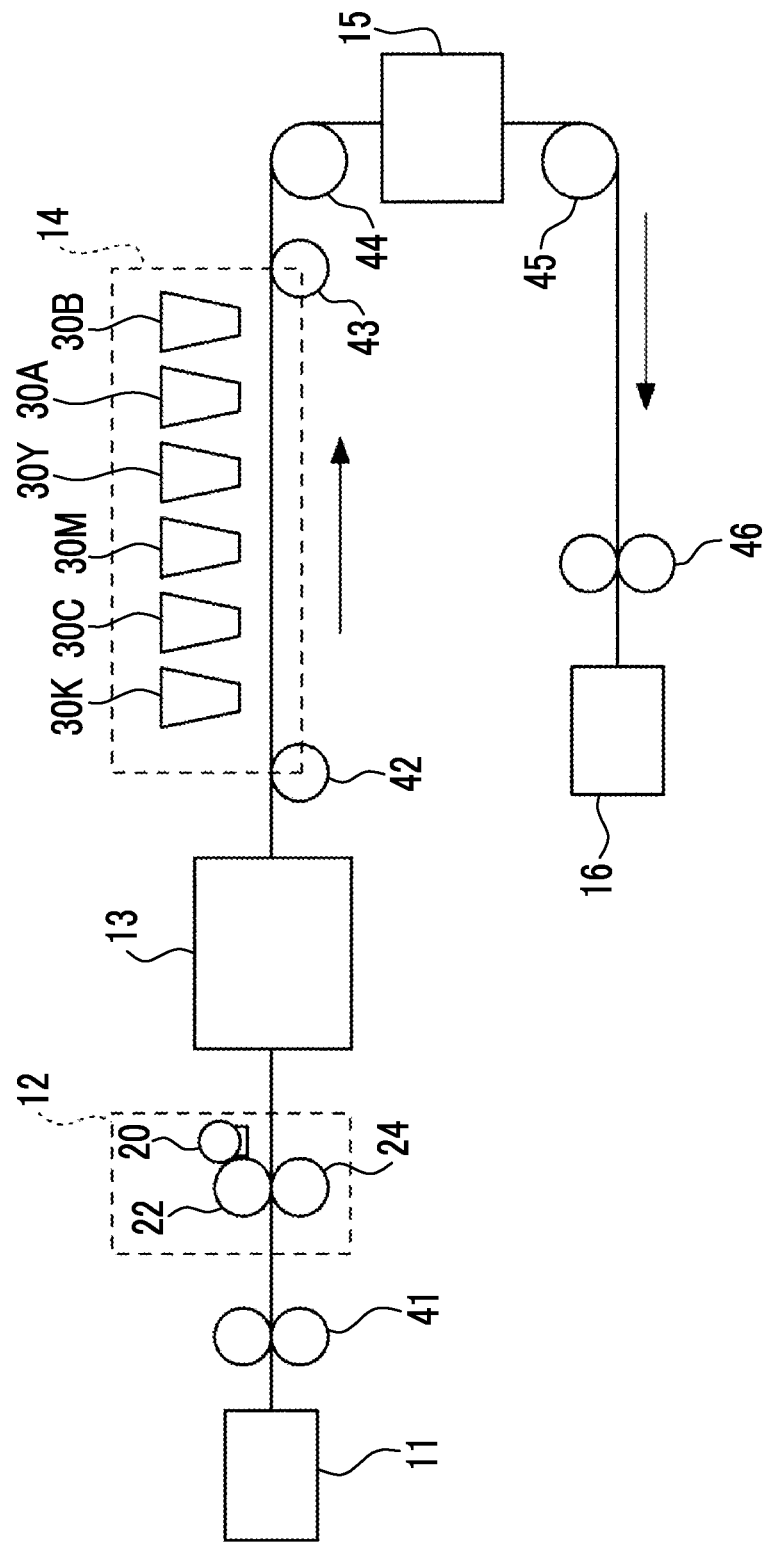
FIG. 1 is a schematic configuration view illustrating a configuration example of an ink jet recording device used for performing image recording.

In the present disclosure, a numerical range shown using "to" indicates a range including the numerical values described before and after "to" as a lower limit and an upper limit.

In the present disclosure, in a case where a plurality of substances corresponding to respective components in a composition are present, the amount of the respective components in the composition indicates the total amount of the plurality of substances present in the composition unless otherwise specified.

In a numerical range described in a stepwise manner in the present disclosure, an upper limit or a lower limit described in a certain numerical range may be replaced with an upper limit or a lower limit in another numerical range described in a stepwise manner or may be replaced with a value shown in an example.

In the present disclosure, the meaning of the term "step" includes not only an independent step but also a step whose intended purpose is achieved even in a case where the step is not clearly distinguished from other steps.

In the present disclosure, "image recording" or "recording an image" means that an image is drawn on an impermeable medium using a pretreatment liquid (or a treatment layer containing a solid content of the pretreatment liquid) and an ink.

In the present disclosure, the "image quality" indicates the resolution of an image.

In the present disclosure, a combination of preferred embodiments is a more preferred embodiment.

<<Pretreatment Liquid for Impermeable Medium>>

A pretreatment liquid for an impermeable medium (hereinafter, also simply referred to as a "pretreatment liquid") according to the embodiment of the present disclosure contains water, a resin, and an organic acid. The ratio of the content of the resin to the content of the organic acid is greater than 0 and less than 4 on a mass basis, and the organic acid is a compound represented by Formula 1.

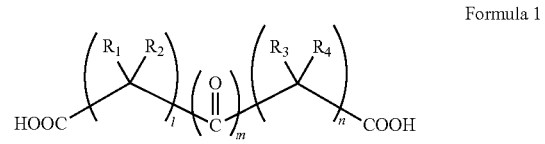

Formula 1

In Formula 1, l represents 1 or greater, m represents 0 or 1, n represents 1 or greater, and l+m+n is 2 or greater. $R_1$ to $R_4$ each independently represent a hydrogen atom, a hydroxyl group, a carboxy group, an amino group, or an alkyl group having 1 to 4 carbon atoms.

In a case where the pretreatment liquid contains an organic acid as an aggregating agent, the resolution of an image of an image recorded material to be obtained can be improved.

However, in a case where an image is recorded by applying an ink onto the surface of the impermeable medium onto which the pretreatment liquid has been applied for the purpose of improving the resolution of the image, components (for example, an organic acid) contained in the pretreatment liquid present in a non-image recording area where the ink is not present may be transferred to a contact object in contact with the image recording surface. This tendency is significant particularly in a case where the content of the organic acid in the pretreatment liquid is increased. A non-contact object is, for example, the rear surface of an image recording medium in a case where a long impermeable medium on which an image is recorded is wound into a roll shape.

The pretreatment liquid according to the embodiment of the present disclosure contains a resin and an organic acid, and the ratio of the content of the resin to the content of the organic acid is set to be greater than 0 and less than 4 on a mass basis and the structure of the organic acid is represented by Formula 1. In this manner, the affinity between the resin and the organic acid can be improved and the transfer of the pretreatment liquid can be suppressed. Further, in a case where Formula 1 has at least two carboxy groups, since the aggregation rate of the ink is excellent, the image quality can be further improved.

<Organic Acid>

The organic acid in the present disclosure is a compound represented by Formula 1.

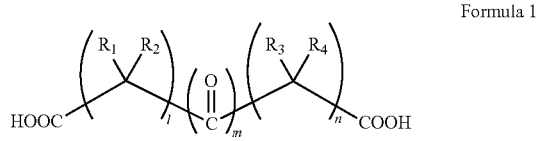

Formula 1

In Formula 1, l represents 1 or greater, m represents 0 or 1, n represents 1 or greater, and l+m+n is 2 or greater. $R_1$ to $R_4$ each independently represent a hydrogen atom, a hydroxyl group (OH), a carboxy group (COOH), an amino group ($NH_2$), or an alkyl group having 1 to 4 carbon atoms.

Examples of the alkyl group having 1 to 4 carbon atoms as $R_1$ to $R_4$ include a methyl group, an ethyl group, a propyl group, and a butyl group.

From the viewpoint of the aggregating properties of the ink, $R_1$ to $R_4$ each independently represent preferably a hydrogen atom or a carboxy group and more preferably a hydrogen atom.

It is preferable that l and n represent 1 to 3 and m represents 0.

In Formula 1, l+m+n is preferably 3 to 8. In a case where l+m+n is 3 or greater, the organic acid can be more hydrophobic, and the property of suppressing the transfer is further improved. In a case where l+m+n is 8 or less, the organic acid is not extremely hydrophobic, and the storage stability of the pretreatment liquid can be satisfactorily maintained.

From the same viewpoint as described above, l+m+n is more preferably 3 to 5.

In Formula 1, it is preferable that m represents 0, and l+n is preferably 3 to 5 in a case where m represents 0.

In Formula 1, it is preferable that m represents 0 and $R_1$ to $R_4$ represent a hydrogen atom.

Further, it is preferable that at least a part of the carboxy group in Formula 1 is dissociated in the pretreatment liquid.

Examples of the organic acid that can be used in the present disclosure include succinic acid, methylsuccinic acid, dimethylsuccinic acid, oxalacetic acid, malic acid, tartaric acid, glutaric acid, citric acid, 1,2,3-propanetricarboxylic acid, 1,3-acetonedicarboxylic acid, methylglutaric acid, dimethylglutaric acid, 2-oxoglutaric acid, adipic acid, butane-1,2,3,4-tetracarboxylic acid, pimelic acid, 1,3,5-pentanetricarboxylic acid, and 4-oxooctanedioic acid.

Among these, from the viewpoints of the image quality, the property of suppressing the transfer, and the storage stability of the pretreatment liquid, glutaric acid, pimelic acid, propanetricarboxylic acid, 1,2,3-propanetricarboxylic acid, and 1,3-acetonedicarboxylic acid are preferable, glutaric acid, pimelic acid, and propanetricarboxylic acid are more preferable, glutaric acid and pimelic acid are still more preferable, and glutaric acid is particularly preferable. These compounds may be used alone or in combination of two or more kinds thereof.

It is preferable that the organic acid contained in the pretreatment liquid has a high solubility in water and is di- or higher valent and more preferable that the organic acid is a di- or trivalent organic acid which has a high buffer capacity in a pH region having a pKa which is lower than the pKa of the functional group (for example, a carboxy group) that allows the particles to be stably dispersed in the ink.

The pKa of the organic acid is preferably in a range of 2.5 to 6.0 and more preferably in a range of 4.0 to 6.0.

In a case where the pKa of the organic acid is 2.5 or greater, the storage stability of the pretreatment liquid can be satisfactorily maintained, and the property of suppressing the transfer can be improved.

Further, when the pKa of the organic acid is 6.0 or less, the pigment contained in the ink is excellent in aggregating property, and the image quality can be further improved.

From the viewpoint described above, the pKa of the organic acid is more preferably 3.5 or greater and still more preferably 4.0 or greater.

In the present disclosure, the pKa is a value calculated using software or known values based on the molecular structure. For example, the pKa can be calculated as a calculated value using Marvin Sketch (manufactured by ChemAxon). Further, in a case where the calculation cannot be performed using Marvin Sketch, values of a partial structure can be assigned and calculated using the values described in "pKa Data Compiled by R. Williams".

The content of the organic acid is not particularly limited, but is preferably in a range of 1% by mass to 20% by mass with respect to the total mass of the pretreatment liquid from the viewpoint of the aggregation rate of the ink. The content of the organic acid is more preferably in a range of 1.5% by mass to 10% by mass and still more preferably in a range of 2% by mass to 5% by mass with respect to the total mass of the pretreatment liquid.

<Resin>

The pretreatment liquid according to the embodiment of the present disclosure contains a resin. In this manner, the adhesiveness between the impermeable medium and the layer to be formed by applying the pretreatment liquid can be improved.

The resin in the present disclosure may be any of a water-soluble resin and a water-insoluble resin, and it is preferable that the resin is water-insoluble.

Further, it is preferable that the resin in the present disclosure has a particulate form.

In the present specification, the term "water-insoluble" indicates a property in which the amount of a substance to be dissolved in 100 g of water at 25° C. is less than 1.0 g (preferably less than 0.5 g). Further, the term "water-soluble" indicates a property in which the amount of a substance to be dissolved in 100 g of water at 25° C. is 5 g or greater (preferably 10 g or greater).

The resin may include only one kind of resin or a plurality of resins.

(Glass Transition Temperature)

The glass transition temperature (Tg) of the resin used in the present disclosure is preferably 30° C. or higher and more preferably in a range of 40° C. to 60° C. In this manner, the hardness of the film formed of the resin is improved, and the transfer of the components (for example, an organic acid) contained in the pretreatment liquid can be suppressed.

In the present disclosure, in a case where the pretreatment liquid contains a plurality of different kinds of resins, the value acquired by the FOX equation described below is referred to as the glass transition temperature of the resin.

In the present disclosure, the glass transition temperature of a resin can be measured using differential scanning calorimetry (DSC).

Specifically, the measuring method is performed in conformity with the method described in JIS K 7121 (1987) or JIS K 6240 (2011). As the glass transition temperature in the present specification, an extrapolated glass transition start temperature (hereinafter, also referred to as Tig) is used.

The method of measuring the glass transition temperature will be described in more detail.

In a case where the glass transition temperature is acquired, the resin is maintained at a temperature lower than the expected Tg of the resin by approximately 50° C. until the device is stabilized, the resin is heated to a temperature higher than the temperature at which the glass transition is completed by approximately 30° C. at a heating rate of 20° C./min, and a differential thermal analysis (DTA) curve or a DSC curve is created.

The extrapolated glass transition start temperature (Tig), that is, the glass transition temperature Tg in the present specification is acquired as the temperature of the intersection between a straight line obtained by extending the base line on a low temperature side in the DTA curve or the DSC curve onto a high temperature side and a tangent drawn at a point where the gradient of a curve from a step-like change portion of the glass transition is maximized.

In the present disclosure, in the case where the pretreatment liquid contains a plurality of different kinds of resins, the Tg of the resin is acquired by the following method.

In a case where the Tg of the first resin is set as $Tg1(K)$, the mass fraction of the first resin with respect to the total mass of the resin components in the resin is set as W1, the Tg of the second resin is set as $Tg2(K)$, and the mass fraction of the second resin with respect to the total mass of the resin components in the resin is set as W2, $Tg0(K)$ of the resin can be estimated according to the following FOX equation.

$$1/Tg0=(W1/Tg1)+(W2/Tg2) \quad \text{FOX equation:}$$

Further, in a case where the resin contains three kinds of resins or the pretreatment liquid contains three kinds of different resins, the Tg of the resin can be estimated according to the following equation similarly to the description above in a case where the Tg of the n-th resin is set as $Tgn(K)$ and the mass fraction of the n-th resin with respect to the total mass of the resin components in the resin is set as Wn.

$$1/Tg0=(W1/Tg1)+(W2/Tg2)+(W3/Tg3)+(Wn/Tgn) \quad \text{FOX equation:}$$

(Water Contact Angle)

The resin used in the present disclosure has a water contact angle of preferably 20° or greater. In this manner, since the resin can be specified as a hydrophobic resin, the affinity between the resin and the organic acid is further improved so that the transfer of the pretreatment liquid can be further suppressed.

From the viewpoint described above, the resin has a water contact angle of more preferably 25° to 45°.

The water contact angle of the resin is measured by the following method.

A solution for measuring the water contact angle (a dispersion liquid for measuring the water contact angle in a case where the resin is water-insoluble) with the following composition is prepared using the resin to be measured. Thereafter, polyethylene terephthalate (PET, FE2001, thickness of 12 μm, manufactured by Futamura Chemical Co., Ltd.) is coated with the prepared solution for measuring the water contact angle such that the liquid coating amount is set to 1.7 μm and the solution was dried at 80° C. for 30 seconds to prepare a film. The measurement of the contact angle is performed on the prepared film after 1 minute using a contact angle meter Drop Master DM700 (manufactured by Kyowa Interface Science Co., Ltd.) in conformity with a method described in JIS R 3257. The liquid droplet amount is set to 2 μL.

—Solution for Measuring Water Contact Angle (Dispersion Liquid for Measuring Water Contact Angle)—

Resin: 15% by mass in terms of solid content
Surfactant: TAYCA POWER BN2070M, 0.7% by mass
Propylene glycol: 10% by mass
Water: remainder In the present disclosure, the solid content indicates the remainder obtained by excluding water in each component and a solvent such as an organic solvent.

In a case where the pretreatment liquid contains a plurality of different kinds of resins, the content of each resin in the solution for measuring the water contact angle is determined based on the contained mass fraction of each resin in the pretreatment liquid such that the total mass of the resins is set to 15% by mass in terms of the solid content described above.

For example, in a case where the content of the first resin is 20% by mass and the content of the second resin is 80% by mass with respect to the total mass of the resins in the pretreatment liquid, the measurement is performed by allowing the solution for measuring the water contact angle to contain 3% by mass of the first resin in terms of the solid content and 12% by mass of the second resin in terms of the solid content.

—Alicyclic Structure or Aromatic Ring Structure—

From the viewpoint of improving the glass transition temperature and the water contact angle, the resin used in the present disclosure has preferably an alicyclic structure or an aromatic ring structure in the structure and more preferably an aromatic ring structure in the structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, or an adamantane ring structure is preferable.

As the aromatic ring structure, a naphthalene ring or a benzene ring is preferable, and a benzene ring is more preferable.

The amount of the alicyclic structure or the aromatic ring structure is not particularly limited, and it is preferable that the amount thereof is set such that the glass transition temperature and the water contact angle of the resin are respectively in the above-described range. For example, the amount thereof is preferably in a range of 0.01 mol to 1.5 mol and more preferably in a range of 0.1 mol to 1 mol per 100 g of the resin.

—Ionic Group—

From the viewpoint that the resin used in the present disclosure is preferably in the form of resin particles having water dispersibility described below, it is preferable that the resin contains an ionic group in the structure.

Examples of the ionic group include a carboxy group, a sulfonic acid group, a phosphoric acid group, a boronic acid group, an amino group, a quaternary ammonium group, and salts thereof. Among these, a carboxy group, a sulfonic acid group, a phosphoric acid group, and salts thereof are preferable, a carboxy group, a sulfonic acid group, and salts thereof are more preferable, and a sulfonic acid group and a salt thereof are still more preferable.

The ionic group may be an anionic group or a cationic group, but an anionic group is preferable from the viewpoints of ease of introduction, the image quality, the adhesiveness, and the property of suppressing the transfer. As the anionic group, a sulfonic acid group or a salt thereof is preferable.

The amount of the ionic group is not particularly limited, and an amount in which the resin is in the form of resin particles having water dispersibility can be preferably used. For example, the amount thereof is preferably in a range of 0.001 mol to 1.0 mol and more preferably in a range of 0.01 mol to 0.5 mol per 100 g of the resin.

(Content)

The content of the resin in the pretreatment liquid used in the present disclosure is preferably in a range of 1% by mass to 25% by mass, more preferably in a range of 2% by mass to 20% by mass, and still more preferably in a range of 3% to 15% by mass with respect to the total mass of the pretreatment liquid.

In the present disclosure, the ratio of the content of the resin to the content of the organic acid is greater than 0 and less than 4 on a mass basis. In a case where the ratio of the content of the resin to the content of the organic acid is greater than 0 on a mass basis, the property of suppressing the transfer and the storage stability of the pretreatment liquid can be improved without extremely increasing the content of the organic acid with respect to the content of the resin.

In a case where the ratio of the content of the resin to the content of the organic acid is less than 4 on a mass basis, satisfactory image quality can be maintained without extremely decreasing the content of the organic acid with respect to the content of the resin.

From the viewpoint described above, the ratio of the content of the resin to the content of the organic acid is preferably greater than 0 and less than 2 on a mass basis.

[Resin Particles]

As the resin, any of a water-soluble resin and resin particles can be used, but resin particles are preferable. Further, resin particles having water dispersibility are more preferable.

In the present disclosure, the water dispersibility indicates a property in which precipitation is not confirmed after a substance is stirred in water at 20° C. and the solution is allowed to stand at 20° C. for 60 minutes.

The resin contained in the resin particles used in the present disclosure is not particularly limited, and examples thereof include a polyurethane resin, a polyamide resin, a polyurea resin, a polycarbonate resin, a polyolefin resin, a polystyrene resin, a polyester resin, and an acrylic resin. Among these, a polyester resin or an acrylic resin is preferable, and a polyester resin is more preferable.

The resin may be composite particles of a plurality of resins selected from the above-described resins. Among these, composite particles of a polyester resin and an acrylic resin are preferable.

—Volume Average Particle Diameter—

The volume average particle diameter of the resin particles is preferably in a range of 1 nm to 300 nm, more preferably in a range of 3 nm to 200 nm, and still more preferably in a range of 5 nm to 150 nm.

In the present disclosure, the volume average particle diameter is measured using a laser diffraction scattering particle size distribution analyzer. As a measuring device, a particle size distribution measuring device "MICROTRAC MT-3300II" (manufactured by Nikkiso Co., Ltd.) is exemplified.

—Weight-Average Molecular Weight—

The weight-average molecular weight (Mw) of the resin particles is preferably in a range of 1000 to 300000, more preferably in a range of 2000 to 200000, and still more preferably in a range of 5000 to 100000.

In the present disclosure, the weight-average molecular weight is measured by gel permeation chromatography (GPC) unless otherwise specified. The measurement according to GPC is performed using HLC-8020GPC (manufactured by Tosoh Corporation), three columns of TSKgel (registered trademark) Super Multipore HZ-H (manufactured by Tosoh Corporation, 4.6 mmID×15 cm), and tetrahydrofuran (THF) as an eluent. Further, the measurement is performed under conditions of a sample concentration of 0.45% by mass, a flow rate of 0.35 ml/min, a sample injection volume of 10 µl, and a measurement temperature of 40° C. using an RI detector. Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

Specific Examples

Specific examples of the resin particles include PESRESIN A124GP, PESRESIN A645GH, and PESRESIN A615GE (all manufactured by Takamatsu Oil & Fat Co., Ltd.), Eastek 1100 and Eastek 1200 (both manufactured by Eastman Chemical Company), PLASCOAT RZ570, PLASCOAT Z687, PLASCOAT Z565, PLASCOAT RZ570, and PLASCOAT Z690 (all manufactured by Goo Chemical Co., Ltd.), VYLONAL (registered trademark) MD1200 (manufactured by Toyobo Co., Ltd.), EM57DOC (manufactured by Daicel FineChem Ltd.), and SUPERFLEX 300 (manufactured by DKS Co., Ltd.).

[Water-Soluble Resin]

The resin may be a water-soluble resin.

The water-soluble resin is not particularly limited, and known water-soluble resins such as polyvinyl alcohol, polyacrylamide, polyvinylpyrrolidone, polyethylene glycol, polyacrylic acid, and polyester can be used.

Further, a synthetic product can be used as the water-soluble resin.

Further, water-soluble resins described in paragraphs 0026 to 0080 of JP2013-001854A are also suitable as the water-soluble resin.

The weight-average molecular weight of the water-soluble resin is not particularly limited, but can be set to be in a range of 10000 to 100000, preferably in a range of 20000 to 80000, and more preferably in a range of 30000 to 80000.

Further, the weight-average molecular weight of the water-soluble resin can be measured by the method described above.

<Water>

The pretreatment liquid contains water.

As the water, ion exchange water, distilled water, or the like can be used.

The content of water is preferably in a range of 50% by mass to 90% by mass and more preferably in a range of 60% by mass to 80% by mass with respect to the total mass of the pretreatment liquid.

<Water-Soluble Solvent>

It is preferable that the pretreatment liquid contains at least one kind of water-soluble solvent.

As the water-soluble solvent, known solvents can be used without particular limitation.

Examples of the water-soluble solvent include glycols such as glycerin, 1,2,6-hexanetriol, trimethylolpropane, ethylene glycol, propylene glycol, diethylene glycol, triethylene glycol, tetraethylene glycol, pentaethylene glycol, and dipropylene glycol; polyhydric alcohols, for example, alkanediol such as 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol; and saccharides, sugar alcohols, hyaluronic acids, alkyl alcohols having 1 to 4 carbon atoms, glycol ethers, 2-pyrrolidone, and N-methyl-2-pyrrolidone described in paragraph 0116 of JP2011-042150A.

Among these, from the viewpoint of suppressing transfer of the components contained in the pretreatment liquid, polyalkylene glycol or a derivative thereof is preferable; and at least one selected from diethylene glycol monoalkyl ether, triethylene glycol monoalkyl ether, dipropylene glycol, tripropylene glycol monoalkyl ether, polyoxypropylene glyceryl ether, and polyoxyethylene polyoxypropylene glycol is more preferable.

From the viewpoint of the coating properties, the content of the water-soluble solvent in the pretreatment liquid is preferably in a range of 3% by mass to 20% by mass and more preferably in a range of 5% by mass to 15% by mass with respect to the total content of the pretreatment liquid.

From the viewpoint of the adhesiveness between the base material and the pretreatment liquid according to the embodiment of the present disclosure, it is preferable that the pretreatment liquid does not contain a water-soluble organic solvent having a solubility parameter (SP value) of 13 or less or the content of the water-soluble organic solvent having an SP value of 13 or less is greater than 0% by mass and less than 10% by mass with respect to the total mass of the pretreatment liquid; more preferable that the pretreatment liquid does not contain a water-soluble organic solvent having an SP value of 13 or less or the content of the water-soluble organic solvent having an SP value of 13 or less is greater than 0% by mass and less than 5% by mass with respect to the total mass of the pretreatment liquid; still more preferable that the pretreatment liquid does not contain a water-soluble organic solvent having an SP value of 13 or less or the content of the water-soluble organic solvent having an SP value of 13 or less is greater than 0% by mass and less than 2% by mass with respect to the total mass of the pretreatment liquid; and particularly preferable that the pretreatment liquid does not contain a water-soluble organic solvent having an SP value of 13 or less.

The SP value in the present disclosure is calculated according to the Okitsu method ("Journal of the Adhesion Society of Japan" 29 (5) (1993), written by Toshinao Okitsu). Specifically, the SP value is calculated according to the following equation. Further, $\Delta F$ is a value described in the document.

$$\text{SP value } (\delta) = \Sigma \Delta F \text{ (Mole Attraction Constants)}/V \text{ (molar volume)}$$

Further, the unit of the SP value in the present disclosure is $(\text{cal/cm}^3)^{1/2}$.

<Surfactant>

The pretreatment liquid may contain at least one surfactant.

The surfactant can be used as a surface tension adjuster or an antifoaming agent. Examples of the surface tension adjuster or the antifoaming agent include a nonionic surfactant, a cationic surfactant, an anionic surfactant, and a betaine surfactant. Among these, from the viewpoint of the aggregation rate of the ink, a nonionic surfactant or an anionic surfactant is preferable.

Examples of the surfactant include compounds exemplified as surfactants in pp. 37 and 38 of JP1984-157636A (JP-S59-157636A) and Research Disclosure No. 308119 (1989). Further, other examples of the surfactant include fluorine-based (fluorinated alkyl) surfactants and silicone-based surfactants described in JP2003-322926A, JP2004-325707A, and JP2004-309806A.

The content of the surfactant in the pretreatment liquid is not particularly limited, but the content thereof can be set such that the surface tension of the pretreatment liquid reaches preferably 50 mN/m or less, more preferably in a range of 20 mN/m to 50 mN/m, and still more preferably in a range of 30 mN/m to 45 mN/m.

(Other Additives)

The pretreatment liquid may contain other components in addition to the above-described components as necessary.

Examples of other components which can be contained in the pretreatment liquid include known additives such as a solid wetting agent, colloidal silica, an inorganic salt, a fading inhibitor, an emulsion stabilizer, a penetration enhancer, an ultraviolet absorbing agent, a preservative, an antibacterial agent, a pH adjuster, a viscosity adjuster, a rust inhibitor, and a chelating agent.

<Physical Properties of Pretreatment Liquid>

From the viewpoint of the aggregation rate of the ink, the pH of the pretreatment liquid at 25° C. is preferably in a range of 0.1 to 3.5.

In a case where the pH of the pretreatment liquid is 2 or greater, the roughness of the impermeable medium is further reduced and the adhesiveness of the image area is further improved.

In a case where the pH of the pretreatment liquid is 4 or less, the aggregation rate is further improved, coalescence of dots (ink dots) caused by the ink on the impermeable medium is further suppressed, and the roughness of the image is further reduced.

The pH (25° C.) of the pretreatment liquid is more preferably in a range of 2.5 to 3.5.

In the present disclosure, the pH is a value measured at 25° C. using a pH meter (model number: HM-31, manufactured by DKK-TOA CORPORATION).

From the viewpoint of the aggregation rate of the ink, the viscosity of the pretreatment liquid is preferably in a range of 0.5 mPa·s to 10 mPa·s and more preferably in a range of 1 mPa·s to 5 mPa·s. The viscosity is a value measured using a VISCOMETER TV-22 (manufactured by TOKI SANGYO CO., LTD.) under a temperature condition of 25° C.

The surface tension of the pretreatment liquid at 25° C. is preferably 60 mN/m or less, more preferably in a range of 20 mN/m to 50 mN/m, and still more preferably in a range of 30 mN/m to 45 mN/m. In a case where the surface tension of the pretreatment liquid is in the above-described range, the adhesiveness between the impermeable medium and the pretreatment liquid is improved. The surface tension of the pretreatment liquid is measured using an Automatic Surface Tensiometer CBVP-Z (manufactured by Kyowa Interface Science Co., Ltd.) according to a plate method.

<Impermeable Medium>

The pretreatment liquid according to the embodiment of the present disclosure is used by being applied to an impermeable medium.

The impermeable medium in the present disclosure indicates a medium having a water absorption amount of less than 4 ml/m² for a contact time of 900 ms (milliseconds) (also referred to as the "water absorption amount at 900 ms") according to the Bristow method.

The impermeable medium is a medium that does not contain paper, and a resin base material is preferable as the medium.

[Resin Base Material]

The resin base material used as the impermeable medium is not particularly limited, and examples thereof include a base material formed of a thermoplastic resin.

A base material obtained by molding the thermoplastic resin in the form of a sheet is exemplified as the resin base material.

It is preferable that the resin base material contains polypropylene, polyethylene terephthalate, nylon, polyethylene, polyimide, or polyvinyl chloride.

The resin base material may be a transparent resin base material or a colored resin base material, and at least a part thereof may be subjected to a metal vapor deposition treatment or the like.

The shape of the resin base material according to the present disclosure is not particularly limited, but a sheet-like resin base material is preferable. From the viewpoint of the productivity of the image recorded material, a resin base material which is capable of forming a roll by winding a sheet-like resin base material is more preferable.

Further, from the viewpoint of suppressing the transfer of the components contained in the pretreatment liquid, particularly, the pretreatment liquid according to the embodiment of the present disclosure can be suitably used in image recording on a resin base material for soft packaging.

The resin base material may have been subjected to a surface treatment.

Examples of the surface treatment include a corona treatment, a plasma treatment, a flame treatment, a heat treatment, an abrasion treatment, a light irradiation treatment (UV treatment), and a flame treatment, but the present invention is not limited thereto. For example, in a case where a corona treatment is performed on the surface of the resin base material before the ink is applied to record an image, the surface energy of the resin base material increases, and wetting of the surface of the resin base material and adhesion of the ink to the resin base material are promoted. The corona treatment can be performed using Corona Master (PS-102S, manufactured by Shinko Electric & Instrumentation Co., Ltd.) or the like. The conditions for the corona treatment may be appropriately selected depending on the circumstances such as the kind of the resin base material and the composition of the ink. For example, the following treatment conditions may be employed.

Treatment voltage: 10 kV to 15.6 kV
Treatment speed: 30 to 100 mm/s

The water contact angle of the surface of the resin base material to which the pretreatment liquid is applied is preferably in a range of 10° to 150° and more preferably in a range of 30° to 100°.

The surface free energy of the surface of the resin base material to which the pretreatment liquid is applied is preferably 10 mNm$^{-1}$ or greater and more preferably 30 mNm$^{-1}$ or greater.

<<Base Material for Image Recording>>

A base material for image recording according to the embodiment of the present disclosure includes an impermeable medium, a resin and an organic acid which is a compound represented by Formula 1 are provided on the impermeable medium, and the ratio of the content of the resin to the content of the organic acid is greater than 0 and less than 4 on a mass basis.

The impermeable medium in the base material for image recording according to the embodiment of the present disclosure, the resin, and the organic acid each have the same definition as that for the impermeable medium in the pretreatment liquid according to the embodiment of the present disclosure, the resin, and the organic acid, and the preferred embodiments thereof are the same as described above.

Further, the base material for image recording according to the embodiment of the present disclosure may further contain the surfactant contained in the pretreatment liquid according to the embodiment of the present disclosure and other additives on the impermeable medium.

The expression "contains a material on the impermeable medium" means that the material may be contained in at least a part of the impermeable medium or on at least one surface thereof in a case where the impermeable medium is a sheet-like medium.

The content of the resin on the impermeable medium in the base material for image recording according to the embodiment of the present disclosure is preferably in a range of 0.01 g/m² to 1.0 g/m² and more preferably in a range of 0.03 g/m² to 0.5 g/m².

The content of the organic acid on the impermeable medium in the base material for image recording according to the embodiment of the present disclosure is preferably in a range of 0.01 g/m² to 1.0 g/m² and more preferably in a range of 0.03 g/m² to 0.5 g/m².

The content of the water-soluble resin on the impermeable medium in the base material for image recording according to the embodiment of the present disclosure is preferably in a range of 0.01 g/m² to 1.0 g/m² and more preferably in a range of 0.03 g/m² to 0.5 g/m².

The content of the surfactant on the impermeable medium in the base material for image recording according to the embodiment of the present disclosure is preferably in a range of 1 mg/m² to 3 g/m² and more preferably in a range of 5 mg/m² to 0.1 g/m².

Further, the ratio of the content of the resin to the content of the organic acid on the impermeable medium in the base material for image recording according to the embodiment of the present disclosure is greater than 0 and less than 4 on a mass basis. In this manner, the transfer can be further suppressed.

From the same viewpoint as described above, the ratio of the content of the resin to the content of the organic acid on the impermeable medium is more preferably less than 2 on a mass basis.

<Method of Producing Base Material for Image Recording>

The method of producing a base material for image recording according to the embodiment of the present disclosure includes a step of applying the pretreatment liquid according to the embodiment of the present disclosure onto the impermeable medium (a pretreatment step).

<Pretreatment Step>

[Method of Applying Pretreatment Liquid]

The application of the pretreatment liquid can be performed by employing a known method such as a coating method, an ink jet method, or an immersion method. The application can be performed according to a known coating method using a bar coater, an extrusion die coater, an air doctor coater, a blade coater, a rod coater, a knife coater, a squeeze coater, or a reverse roll coater. The details of the ink jet method are the same as the details of the ink jet method in an image recording step described below.

As an embodiment of the present disclosure, an embodiment in which the pretreatment liquid is applied onto the impermeable medium in order to aggregate the components in the ink in advance before the application of the ink and the ink is applied so as to come into contact with the pretreatment liquid applied onto the impermeable medium to obtain an image is exemplified. In this manner, the ink jet recording is easily performed at a high speed, and a high-quality image is easily obtained.

The amount of the pretreatment liquid to be applied is not particularly limited as long as the pretreatment liquid enables aggregation of the ink, and it is preferable that the amount thereof can be set such that the amount of the pretreatment liquid to be applied after being dried reaches 0.05 $g/m^2$ or greater. It is preferable that the amount thereof is set such that the amount of the pretreatment liquid to be applied after being dried is in a range of 0.05 $g/m^2$ to 1.0 $g/m^2$.

In a case where the amount of the pretreatment liquid to be applied after being dried is 0.05 $g/m^2$ or greater, transfer of the components contained in the pretreatment liquid tends to be suppressed. Further, in a case where the amount of the pretreatment liquid to be applied after being dried is 1.0 $g/m^2$ or less, the adhesiveness between the impermeable medium and the resin tends to be excellent, and the image is unlikely to be peeled off.

In the pretreatment step, the base material may be heated before the application of the pretreatment liquid.

The heating temperature may be appropriately set depending on the kind of the base material and the composition of the pretreatment liquid, but the temperature of the base material is set to be preferably in a range of 20° C. to 50° C. and more preferably in a range of 25° C. to 40° C.

<Surface Treatment Step>

The method of producing the base material for image recording according to the embodiment of the present disclosure may further include a step of performing a surface treatment on the impermeable medium (also referred to as a "surface treatment step").

Examples of the surface treatment step include a corona treatment, a plasma treatment, a flame treatment, a heat treatment, an abrasion treatment, a light irradiation treatment (UV treatment), and a flame treatment, but the present invention is not limited thereto.

<Drying Step>

The method of producing the base material for image recording according to the embodiment of the present disclosure may further include a drying step.

As the drying, drying by heating is preferable.

From the viewpoint of the adhesiveness between the impermeable medium and the pretreatment liquid, it is preferable that the heating temperature of the image is a temperature higher than the Tg of the resin contained in the pretreatment liquid.

Examples of the means for performing heating and drying include known heating means such as a heater, known air blowing means such as a dryer, and means for combining these.

Examples of the method for performing heating and drying the image include a method of applying heat from a side of a recording medium (impermeable medium) opposite to an image recording surface thereof using a heater or the like, a method of applying warm air or hot air to an image recording surface of a recording medium, a method of applying heat from an image recording surface of a recording medium or from a side of a recording medium opposite to an image recording surface thereof using an infrared heater, and a method of combining a plurality of these methods.

The heating temperature of the image at the time of heating and drying is preferably 60° C. or higher, more preferably 65° C. or higher, and particularly preferably 70° C. or higher.

The upper limit of the heating temperature is not particularly limited, and the upper limit thereof may be 100° C. and preferably 90° C.

The time of heating and drying the image is not particularly limited, but is preferably in a range of 3 seconds to 60 seconds, more preferably in a range of 5 seconds to 30 seconds, and particularly preferably in a range of 5 seconds to 20 seconds.

(Image Recording Method)

An image recording method according to a first embodiment of the present disclosure includes a step of applying the pretreatment liquid according to the embodiment of the present disclosure to the impermeable medium (pretreatment step), and a step of jetting the ink composition containing a colorant and water by an ink jet method onto the surface of the impermeable medium to which the pretreatment liquid has been applied and recording an image (image recording step).

An image recording method according to a second embodiment of the present disclosure includes a step of jetting the ink composition containing a colorant and water by an ink jet method onto a surface of the base material for image recording according to the embodiment of the present disclosure which contains a resin and an organic acid and recording an image (image recording step).

The pretreatment step in the image recording method according to the first embodiment of the present disclosure is the same as the pretreatment step in the method of producing the base material for image recording according to the embodiment of the present disclosure, and the preferred embodiments thereof are the same as described above.

As the base material for image recording used for the image recording method according to the second embodiment of the present disclosure, a base material for image recording which is produced in advance according to the method of producing the base material for image recording according to the embodiment of the present disclosure may be used or the base material for image recording according to the embodiment of the present disclosure may be obtained by purchase or the like and then used.

Hereinafter, the image recording step included in the image recording method according to the first embodiment of the present disclosure and the image recording step included in the image recording method according to the second embodiment of the present disclosure will be described.

<Image Recording Step>

The image recording method according to the first embodiment of the present disclosure includes an image recording step of jetting the ink composition (in the present specification, also simply referred to as the "ink") that contains a colorant and water to the surface of the impermeable medium to which the pretreatment liquid has been applied according to an ink jet method and recording an image.

In the present step, the ink can be selectively applied onto the impermeable medium so that a desired visible image can be recorded.

In the image recording according to an ink jet method, a colored image is recorded by providing the energy so that the ink is jetted onto a desired impermeable medium. Further, as a preferable ink jet method in the present disclosure, the method described in paragraphs 0093 to 0105 of JP2003-306623A can be employed.

The ink jet method is not particularly limited, and any of known methods such as an electric charge control method of jetting an ink using electrostatic attraction force; a drop-on-demand method (pressure pulse method) using a vibration pressure of a piezoelectric element; an acoustic ink jet method of jetting an ink using a radiation pressure by converting an electric signal into an acoustic beam and irradiating the ink with the acoustic beam; and a thermal ink jet (also referred to as a bubble jet (registered trademark)) method of heating an ink to form bubbles and utilizing the generated pressure may be used. As an ink jet method, particularly, an ink jet method, described in JP1979-059936A (JP-S54-059936A), of jetting an ink from a nozzle using an action force caused by a rapid change in volume of the ink after being subjected to an action of thermal energy can be effectively used.

A short serial head is used as the ink jet head, and a shuttle system of performing recording while scanning a head in the width direction of the impermeable medium and a line system of using a line head in which recording elements are aligned in correspondence with the entire area of one side of the impermeable medium may be exemplified. In the line system, image recording can be performed on the entire surface of the impermeable medium by scanning the impermeable medium in a direction intersecting the direction in which the recording elements are aligned. Therefore, a transport system such as a carriage that scans a short head is unnecessary. Further, since movement of a carriage and complicated scanning control between the head and the impermeable medium is unnecessary and only the impermeable medium moves, the recording at a higher recording speed compared to the shuttle system can be realized. The image recording method according to the embodiment of the present disclosure can be applied to any of these, but an effect of improving the jetting accuracy and the rub resistance of an image increases in a case where the image recording method is applied to the line system that does not usually perform a dummy jet.

From the viewpoint of obtaining an image with high definition, the liquid droplet amount of the ink to be jetted from the ink jet head is preferably in a range of 1 pl (pico liter) to 10 pl and more preferably in a range of 1.5 pl to 6 pl. In addition, from the viewpoints of improving the image irregularity and improving connection of continuous gradations, it is also effective that the ink is jetted by combining different amounts of liquid droplets.

[Ink Composition]

Hereinafter, the ink composition used in the embodiment of the present disclosure will be described.

It is preferable that the ink composition used in the present disclosure contains a colorant and water and the ink composition is an aqueous ink composition. In the present disclosure, the aqueous ink composition indicates an ink composition containing 50% by mass or greater of water with respect to the total mass of the ink.

Further, the content of the organic solvent in the ink composition of the present disclosure is preferably less than 50% by mass and more preferably 40% by mass or less with respect to the total mass of the ink composition.

Further, it is preferable that the ink composition of the present disclosure does not contain a polymerizable compound or the content of the polymerizable compound is greater than 0% by mass and 10% by mass or less and more preferable that the ink composition does not contain a polymerizable compound.

Examples of the polymerizable compound include a cationic polymerizable compound and a radical polymerizable compound.

—Colorant—

The colorant is not particularly limited and a colorant known in the field of the ink jet ink can be used, but an organic pigment or an inorganic pigment is preferable.

Examples of the organic pigment include an azo pigment, a polycyclic pigment, a chelate dye, a nitro pigment, a nitroso pigment, and aniline black. Among these, an azo pigment and a polycyclic pigment are more preferable.

Examples of the inorganic pigment include titanium oxide, iron oxide, calcium carbonate, barium sulfate, aluminum hydroxide, yellow barium, cadmium red, chrome yellow, and carbon black. Among these, carbon black is particularly preferable.

Preferred examples of the colorant include the colorants described in paragraphs 0096 to 0100 of JP2009-241586A.

The content of the colorant is preferably in a range of 1% by mass to 25% by mass, more preferably in a range of 2% by mass to 20% by mass, still more preferably in a range of 5% by mass to 20% by mass, and particularly preferably in a range of 5% by mass to 15% by mass with respect to the total mass of the ink composition.

—Water—

It is preferable that the ink composition contains water.

The content of water is preferably in a range of 50% by mass to 90% by mass and more preferably in a range of 60% by mass to 80% by mass with respect to the total mass of the ink composition.

—Dispersant—

The ink composition used in the present disclosure may contain a dispersant for dispersing the colorant. As the dispersant, any of a polymer dispersant or a low-molecular-weight surfactant-type dispersant may be used. Further, as the polymer dispersant, any of a water-soluble dispersant or a water-insoluble dispersant may be used.

Preferred examples of the dispersant include dispersants described in paragraphs 0080 to 0096 of JP2016-145312A.

The mixing mass ratio between a colorant (p) and a dispersant (s) (p:s) is preferably in a range of 1:0.06 to 1:3, more preferably in a range of 1:0.125 to 1:2, and still more preferably in a range of 1:0.125 to 1:1.5.

—Resin Particles—

The ink composition in the present disclosure may contain at least one kind of resin particles. In a case where the ink composition contains resin particles, the fixing property of mainly the ink composition to the recording medium (impermeable medium) and the rub resistance can be improved. Further, the resin particles have a function of fixing the ink composition, that is, an image by being unstably aggregated or dispersed in a case of being in contact with the organic acid described above and thickening the ink composition. It is preferable that such resin particles are dispersed in water or a water-containing organic solvent.

Preferred examples of the resin particles include the resin particles described in paragraphs 0062 to 0076 of JP2016-188345A.

From the viewpoint of the rub resistance of an image to be obtained, it is preferable that the Tg of the resin particles contained in the ink composition is higher than the Tg of the above-described resin.

—Water-Soluble Organic Solvent—

It is preferable that the ink composition used in the present disclosure contains at least one water-soluble organic solvent. By using a water-soluble organic solvent, the effect of preventing drying of the ink composition and the effect of wetting of the ink composition can be obtained. In order to prevent drying, the water-soluble organic solvent is used as an anti-drying agent for preventing clogging caused due to an aggregate which is formed in a state where the ink adheres and is dried at an ink jet port of an ejection nozzle. Further, a water-soluble organic solvent having a lower vapor pressure than that of water is preferable for preventing drying of the ink composition and for wetting of the ink composition.

In addition, the boiling point of the water-soluble organic solvent at 1 atm (1013.25 hPa) is preferably in a range of 80° C. to 300° C. and more preferably in a range of 120° C. to 250° C.

As the anti-drying agent, a water-soluble organic solvent which has a lower vapor pressure than that of water is preferable. Specific examples of such a water-soluble organic solvent include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerin, and trimethylolpropane.

Among these, polyhydric alcohol such as glycerin or diethylene glycol is preferable as the anti-drying agent.

The anti-drying agent may be used alone or in combination of two or more kinds thereof. The content of the anti-drying agent is preferably in a range of 10% to 50% by mass with respect to the total mass of the ink composition.

The water-soluble organic solvent is used for adjusting the viscosity in addition to the purposes described above. Specific examples of the water-soluble organic solvent which can be used for adjusting the viscosity include alcohols (such as methanol, ethanol, propanol, isopropanol, butanol, isobutanol, sec-butanol, t-butanol, pentanol, hexanol, cyclohexanol, and benzyl alcohol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (such as ethylene glycol monomethyl ether, ethylene glycol monoethyl ether, ethylene glycol monobutyl ether, diethylene glycol monomethyl ether, diethylene glycol monobutyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (such as formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone). Even in a case, the water-soluble organic solvent may also be used alone or in combination of two or more kinds thereof.

—Other Additives—

The ink composition used in the present disclosure can be formed using additives other than the above-described components. Examples of other additives include known additives such as an anti-drying agent (wetting agent), a fading inhibitor, an emulsion stabilizer, a penetration enhancer, an ultraviolet absorbing agent, a preservative, an antibacterial agent, a pH adjuster, a surface tension adjuster, an antifoaming agent, a viscosity adjuster, a dispersant, a dispersion stabilizer, a rust inhibitor, and a chelating agent.

The image recording step in the image recording method according to the second embodiment of the present disclosure includes an image recording step of jetting the ink composition that contains a colorant and water to the surface of the base material for image recording which contains the resin and the organic acid according to an ink jet method and recording an image.

The details of the image recording step in the image recording method according to the second embodiment of the present disclosure are the same as the details of the image recording step in the image recording method according to the first embodiment of the present disclosure.

<Drying Step>

The image recording method according to the first embodiment of the present disclosure may include a drying step.

The drying step can be performed at any one or both timings after the pretreatment step and before the image recording step, and after the image recording step.

As the drying, drying by heating is preferable.

From the viewpoint of the adhesiveness between the impermeable medium and the pretreatment liquid, it is preferable that the heating temperature of the image is a temperature higher than the Tg of the resin contained in the pretreatment liquid.

From the viewpoint of the rub resistance of the image, it is preferable that the heating temperature of the image is a temperature lower than the Tg of the resin particles in a case where the ink composition contains the resin particles.

Further, from the viewpoint of achieving both the adhesiveness between the impermeable medium and the pretreatment liquid and the rub resistance of the image, it is preferable that the heating temperature of the image is higher than the Tg of the resin contained in the pretreatment liquid and is lower than the Tg of the resin particles contained in the ink composition in a case where the ink composition contains the resin particles.

Examples of the means for heating and drying the image include known heating means such as a heater, known air blowing means such as a dryer, and means for combining these.

Examples of the method for performing heating and drying the image include a method of applying heat from a side of a recording medium (impermeable medium) opposite to an image recording surface thereof using a heater or the like, a method of applying warm air or hot air to an image recording surface of a recording medium, a method of applying heat from an image recording surface of a recording medium or from a side of a recording medium opposite to an image recording surface thereof using an infrared heater, and a method of combining a plurality of these methods.

The heating temperature of the image at the time of heating and drying is preferably 60° C. or higher, more preferably 65° C. or higher, and particularly preferably 70° C. or higher.

The upper limit of the heating temperature is not particularly limited, and the upper limit thereof may be 100° C. and preferably 90° C.

The time of heating and drying the image is not particularly limited, but is preferably in a range of 3 seconds to 60 seconds, more preferably in a range of 5 seconds to 30 seconds, and particularly preferably in a range of 5 seconds to 20 seconds.

Further, the image recording method according to the second embodiment of the present disclosure may include a drying step after the image recording step. The details of the drying step are the same as the details of the drying step included in the image recording method according to the first embodiment of the present disclosure.

<Ink Jet Recording Device>

An image recording device which can be used for the image recording method according to the embodiment of the present disclosure is not particularly limited, and known image recording devices described in JP2010-083021A, JP2009-234221A, and JP1998175315A (JP-H10-175315A) can be used.

Hereinafter, an example of the image recording device which can be used for the image recording method according to the first embodiment of the present disclosure will be described with reference to FIG. 1.

Next, an example of the ink jet recording device suitable for performing the image recording method according to the first embodiment of the present disclosure will be described in detail with reference to FIG. 1.

The device illustrated in FIG. 1 has means for applying the pretreatment liquid, but the image recording method according to the second embodiment of the present disclosure can also be performed by not using the means or by using a device formed by excluding the means.

FIG. 1 is a schematic configuration view illustrating the configuration example of the entire ink jet recording device.

As illustrated in FIG. 1, the ink jet recording device is provided with a pretreatment liquid application unit 12 which comprises an anilox roller 20 and a coating roller 22 brought into contact with the anilox roller 20, as roller materials for sequentially applying the pretreatment liquid in a transport direction (the arrow direction in the figure) of the recording medium (impermeable medium); a pretreatment liquid drying zone 13 which comprises heating means (not illustrated) for drying the applied pretreatment liquid; an ink jetting unit 14 which jets various inks; and an ink drying zone 15 where the jetted ink is dried.

The recording medium supplied to this ink jet recording device is accumulated in an accumulation unit 16 after sequentially being sent to the pretreatment liquid application unit 12, the pretreatment liquid drying zone 13, the ink jetting unit 14, and the ink drying zone 15 by transport rollers (for example, transport rollers 41 to 46 in FIG. 1) from a supply unit 11 that supplies the recording medium from a case filled with the recording medium, a supply unit that supplies the recording medium from a roll formed by the recording medium being wound into a roll shape, and the like. In the accumulation unit, the recording medium may be wound into a roll shape. As the method for carrying out transportation, a drum transport system using a drum-like member, a belt transport system, or a stage transport system using a stage may be employed in addition to the method of carrying out transport using a transport roller.

Among the plurality of arranged transport rollers, at least one roller can be formed into a driving roller to which the power of a motor (not illustrated) has been transmitted. The recording medium is transported in a predetermined direction by a predetermined transportation amount by rotating the driving roller rotated by the motor at a constant speed.

The pretreatment liquid application unit 12 is provided with the anilox roller 20 disposed by being partially immersed in a storage tray in which the pretreatment liquid is stored and the coating roller 22 brought into contact with the anilox roller 20. The anilox roller 20 is a roller material for supplying a predetermined amount of the pretreatment liquid to the coating roller 22 disposed by opposing the recording surface of the recording medium. The recording medium is uniformly coated with the pretreatment liquid by the coating roller 22 to which an appropriate amount of the pretreatment liquid has been supplied from the anilox roller 20.

The coating roller 22 is configured so as to transport the recording medium in a pair with an opposing roller 24, and the recording medium passes between the coating roller 22 and the opposing roller 24 and is sent to the pretreatment liquid drying zone 13.

The pretreatment liquid drying zone 13 is disposed on a downstream side of the pretreatment liquid application unit 12 in the recording medium transport direction. The pretreatment liquid drying zone 13 can be configured using known heating means such as a heater, air blowing means for blowing air such as a dryer, or means for combining these. Examples of the heating means include a method of installing a heating element such as a heater on a side (for example, below a transport mechanism that carries and transports the recording medium in a case of automatically transporting the recording medium) of the recording medium opposite to the surface to which the pretreatment liquid has been applied, a method of applying warm air or hot air to the surface of the recording medium to which the pretreatment liquid has been applied, and a heating method of using an infrared heater, and the heating may be carried out by combining a plurality of these methods.

Further, since the surface temperature of the recording medium changes depending on the kind (the material, the thickness, or the like) of the recording medium or the environmental temperature, it is preferable that the pretreatment liquid is applied while the temperature is controlled by providing a measuring unit that measures the surface temperature of the recording medium and a control mechanism that feeds back the value of the surface temperature of the recording medium measured by the measuring unit to a heat control unit. As the measuring unit that measures the surface temperature of the recording medium, a contact or non-contact type thermometer is preferable.

Further, the solvent may be removed using a solvent removal roller. As another embodiment, a system of eliminating an excess solvent from the recording medium using an air knife is also used.

The ink jetting unit 14 is disposed on a downstream side of the pretreatment liquid drying zone 13 in the recording medium transport direction. In the ink jetting unit 14, recording heads (ink jet heads) 30K, 30C, 30M, 30Y, 30A, and 30B that are respectively connected to ink storage units storing inks with respective colors, which are black (K), cyan (C), magenta (M), yellow (Y), a special color ink (A), and a special color ink (B) are arranged. The respective ink storage units (not illustrated) are configured such that the ink containing pigments corresponding to each hue, the resin particles, the water-soluble solvent, and water is stored and the ink is supplied to respective ink jet heads 30K, 30C, 30M, 30Y, 30A, and 30B in a case of image recording as necessary.

Examples of the special color ink (A) and the special color ink (B) include white ink, orange ink, green ink, purple ink, red ink, blue ink, light cyan ink, and light magenta ink.

In the ink jet recording device according to the present disclosure, the ink jet heads 30A and 30B may not be provided. Further, the image recording device may comprise other special color ink jet heads in addition to the ink jet heads 30A and 30B.

Further, it is described that the ink jet heads 30A and 30B are positioned behind the yellow (Y) ink jet head 30Y in FIG. 1 for convenience, but the position thereof is not particularly limited and may be appropriately set in consideration of the brightness or the like of the special color inks.

For example, an embodiment in which the ink jet heads 30A and 30B are positioned between the yellow ink jet head 30Y and the magenta ink jet head 30M or an embodiment in which the ink jet heads 30A and 30B are positioned between the magenta ink jet head 30M and the cyan ink jet head 30C is considered.

Further, it is preferable that the ink jet head 30B is a white ink jet head.

The ink jet heads 30K, 30C, 30M, 30Y, 30A, and 30B are used to jet inks corresponding to each image from jet nozzles arranged to oppose the recording surface of the recording medium. In this manner, each color ink is applied onto the recording surface of the recording medium, and thus a color image is recorded.

The ink jet heads 30K, 30C, 30M, 30Y, 30A, and 30B are all full line heads in which a plurality of jet ports (nozzles) are aligned over the maximum recording width (maximum recording width) of an image to be recorded on the recording medium. The image recording can be performed on the recording medium at a higher speed as compared to a serial type head in which recording is performed while reciprocating and scanning a short shuttle head in the width direction (a direction orthogonal to the transport direction on the recording medium transport surface) of the recording medium. In the present disclosure, any recording system, for example, a system that enables serial type recording or recording at a relatively high speed, such as a single pass system of forming one line by performing scanning once may be employed. According to the image recording method according to the embodiment of the present disclosure, a high-quality image with excellent reproducibility can be obtained even with the single pass system.

Here, the ink jet heads 30K, 30C, 30M, 30Y, 30A, and 30W all have the identical structure.

It is preferable that the application amount of the pretreatment liquid and the application amount of the ink are adjusted as necessary. For example, the application amount of the pretreatment liquid may be changed in order to adjust the physical properties such as the viscoelasticity and the like of the aggregate obtained by mixing the pretreatment liquid with the ink, depending on the recording medium.

The ink drying zone 15 is disposed on a downstream side of the ink jetting unit 14 in the transport direction of the recording medium. The ink drying zone 15 can be configured in the same manner as the pretreatment liquid drying zone 13.

Further, heating means for performing a heat treatment on the recording medium can be disposed on the transport path from the supply unit to the accumulation unit of the ink jet recording device. For example, drying and fixing can be effectively performed by disposing the heating means at a desired position such as on the upstream side of the pretreatment liquid drying zone 13 or between the ink jetting unit 14 and the ink drying zone 15 so that the recording medium is heated to a desired temperature.

(Ink Set)

An ink set according to the embodiment of the present disclosure includes an ink composition containing a colorant and water, and the pretreatment liquid for an impermeable medium according to the embodiment of the present disclosure.

The ink composition in the ink set according to the embodiment of the present disclosure has the same definition as that for the ink composition used for the image recording method according to the embodiment of the present disclosure, and the preferred embodiments thereof are the same as described above.

EXAMPLES

Hereinafter, the present invention will be described in more detail based on examples, but the present invention is not limited to the following examples unless the gist thereof is overstepped.

In the present example, the pH was measured at 25° C. using a pH meter (model number: HM-31, manufactured by DKK-TOA CORPORATION).

In the present example, the pKa was calculated as a calculated value using Marvin Sketch (manufactured by ChemAxon) based on the molecular structure. Further, in a case where the calculation was not able to be performed using Marvin Sketch, values of a partial structure were assigned and calculated using the values described in "pKa Data Compiled by R. Williams".

In the present example, the volume average particle diameter was measured using a particle size distribution measuring device "Microtrac MT-3300II".

In the present example, the weight-average molecular weight was measured by gel permeation chromatography (GPC). The measurement according to GPC was performed using HLC-8020GPC (manufactured by Tosoh Corporation), three columns of TSKgel (registered trademark) Super Multipore HZ-H (manufactured by Tosoh Corporation, 4.6 mmID×15 cm), and tetrahydrofuran (THF) as an eluent. Further, the measurement is performed under conditions of a sample concentration of 0.45% by mass, a flow rate of 0.35 ml/min, a sample injection volume of 10 μl, and a measurement temperature of 40° C. using an RI detector. Further, the calibration curve was prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

Examples 1 to 11 and Comparative Examples 1 to 3

<Preparation of Pretreatment Liquid>

The respective components were mixed according to the following composition to prepare pretreatment liquids 1 to 11 and comparative pretreatment liquids 1 to 3 in each example or each comparative example.

—Composition of Pretreatment Liquid—

Resin: types and amounts listed in Table 1

Organic acid: types and amounts listed in Table 1

Organic solvent: propylene glycol (manufactured by Fujifilm Wako Pure Chemical Corporation, SP value=17.2 (cal/cm$^3$)$^{1/2}$), 5% by mass OLFINE E1010 (surfactant, manufactured by Nissin Chemical Co., Ltd.): 0.1% by mass Antifoaming agent: TSA-739 (TSA-739 (15%), manufactured by Momentive Performance Materials Japan LLC, emulsion type silicone antifoaming agent): 0.01% by mass Ion exchange water: remaining amount set such that the total amount of the composition was 100% by mass <Preparation of Ink Composition>

Respective components described in the section of "composition of magenta ink" below were mixed to prepare magenta ink.

Further, respective components described in the section of "composition of cyan ink" below were mixed to prepare cyan ink.

<Composition of Magenta Ink>

Projet Magenta APD1000 (manufactured by FUJIFILM Imaging Colorants Ltd, magenta pigment dispersion liquid, pigment concentration: 14% by mass): 30% by mass Propylene glycol (PG): 20.0% by mass OLFINE E1010 (surfactant, manufactured by Nissin Chemical Co., Ltd.): 1.0% by mass The following polymer particles B-01 (resin particles): 8% by mass Ion exchange water: remaining amount set such that the total amount of the composition was 100% by mass <Composition of Cyan Ink>

Projet Cyan APD1000 (manufactured by FUJIFILM Imaging Colorants Ltd., cyan pigment dispersion liquid, pigment concentration: 12% by mass): 20% by mass Propylene glycol (PG: water-soluble solvent): 20.0% by mass OLFINE E1010 (surfactant, manufactured by Nissin Chemical Co., Ltd.): 1.0% by mass Polymer particles B-01 (resin particles) shown below: 8% by mass Ion exchange water: remaining amount set such that the total amount of the composition was 100% by mass

[Synthesis of Polymer Particles B-01]

The polymer particles B-01 were prepared in the following manner.

A 2 L three-neck flask provided with a stirrer, a thermometer, a reflux cooling pipe, and a nitrogen gas introduction pipe was charged with 560.0 g of methyl ethyl ketone, and the solution was heated to 87° C. Next, a mixed solution formed of 220.4 g of methyl methacrylate, 301.6 g of isobornyl methacrylate, 58.0 g of methacrylic acid, 108 g of methyl ethyl ketone, and 2.32 g of "V-601" (polymerization initiator, manufactured by Fujifilm Wako Pure Chemical Corporation; dimethyl 2,2'-azobis(2-methylpropionate)) was added dropwise to the methyl ethyl ketone in the reaction container at a constant speed such that the dropwise addition was completed for 2 hours while the reflux state in the reaction container was maintained (hereinafter, the reflux state was maintained until the reaction was completed). After completion of the dropwise addition, the solution was stirred for 1 hour, and the operation of the following step (1) was performed on the solution after being stirred for 1 hour.

Step (1) . . . . A solution formed of 1.16 g of "V-601" and 6.4 g of methyl ethyl ketone was added to the solution, and the resulting solution was stirred for 2 hours.

Next, the operation of the step (1) was repeatedly performed four times, a solution formed of 1.16 g of "V-601" and 6.4 g of methyl ethyl ketone was added to the solution, and the resulting solution was stirred for 3 hours (the operation carried out so far is referred to as the "reaction").

After the completion of the reaction, the temperature of the solution was decreased to 65° C., 163.0 g of isopropanol was added to the solution, and the solution was allowed to be naturally cooled, thereby obtaining a polymerization solution (concentration of solid contents: 41.0% by mass) containing a copolymer of methyl methacrylate, isobornyl methacrylate, and methacrylic acid (=38/52/10 [mass ratio]).

The weight-average molecular weight (Mw) of the copolymer was 63000, and the acid value thereof was 65.1 (mgKOH/g).

Next, 317.3 g (concentration of solid contents: 41.0% by mass) of the obtained polymerization solution was weighed, 46.4 g of isopropanol, 1.65 g of a 20 mass % maleic acid anhydride aqueous solution (water-soluble acidic compound, corresponding to 0.3% by mass as maleic acid with respect to the copolymer), and 40.77 g of a 2 mol/L sodium hydroxide (NaOH) aqueous solution were added to the solution, and the temperature of the liquid in the reaction container was increased to 70° C.

Next, 380 g of distilled water was added dropwise to the solution, which had been heated to 70° C., at a speed of 10 ml/min, and water dispersion was performed (dispersion step).

Thereafter, a total amount of 287.0 g of isopropanol, methyl ethyl ketone, and distilled water was distilled off by maintaining the temperature of the liquid in the reaction container at 70° C. for 1.5 hours under reduced pressure (solvent removal step). 0.278 g (440 ppm as benzisothiazolin-3-one as the solid content in the polymer) of PROXEL GXL (S) (manufactured by Arch Chemicals, Inc.) was added to the obtained solution.

The obtained liquid was filtered using a filter having a mesh diameter of 1 and the filtrate was collected, thereby obtaining an aqueous dispersion of the polymer particles B-01 whose concentration of solid contents was 26.5% by mass.

(Evaluation)

<Evaluation of Transfer (Blocking) of Components Contained in Pretreatment Liquid>

In each example and each comparative example, a polyester film FE2001 (resin base material, polyethylene terephthalate (PET), manufactured by Futamura Chemical Co., Ltd., width of 25 μm) was transported at 500 mm/sec, coated with the pretreatment liquid listed in Table 1 at approximately 1.7 g/m$^2$ (liquid coating amount; 0.1 g/m$^2$ to 0.2 g/m$^2$ as dry coating amount) using a wire bar coater, dried with warm air at a film surface temperature of 80° C. for 20 seconds, wound into a roll shape such that the surface pressure was set to 50 kPa, and allowed to stand at room temperature (25° C.) for 1 day. Thereafter, the base material was unwound, the presence of transfer of the pretreatment liquid to the rear surface of the base material where the coating surface was brought into contact with was visually confirmed, and the transfer amount was evaluated according to the following measuring method.

Specifically, an A4-sized rectangular region (29.7 cm in the length direction of the resin base material, and 21 cm in the width direction of the resin base material) was cut out at a position of 1000 m from the end portion of the wound resin base material in the length direction, the transfer amount of the component contained in the pretreatment liquid in the cut-out base material was measured according to the following method, and the arithmetic average value of the transfer amount was calculated.

The cut position in the length direction was set to be the center in the length direction of the A4-sized region at the position of 1000 m.

The cut position in the width direction was set such that the center of the cut A4-sized region in the width direction was the center of the base material in the width direction.

[Method of Measuring Transfer Amount]

The measurement was performed using MigraCell (registered trademark) MC150 (manufactured by FABES Forschungs-GmbH).

Specifically, the cut rectangular base material was set such that the surface on a side opposite to the surface coated with the pretreatment liquid was an extraction surface in MC150, 20 mL of a solvent (methanol/water=1:1 (volume ratio)) was added thereto, MC150 was covered with a lid, and the base material was allowed to stand for 1 day. The set position was set to a position where the center of the rectangular base material and the center of the extraction region in MC150 visually overlapped each other.

After the base material was allowed to stand, the extraction amount (transfer amount, mg/dm$^2$) of the resin base material per unit area was calculated by dividing the mass of the dried material of the solvent after being taken out and dried by the extraction area (2.0 dm$^2$).

—Evaluation Standards—

The evaluation was performed based on the following five evaluation standards 1 to 5, and the evaluation results are listed in Table 1.

5: Transfer was not able to be visually confirmed, and the transfer amount was 0.01 mg/dm$^2$ or less.

4: Transfer was not able to be visually confirmed, and the transfer amount was greater than 0.01 mg/dm$^2$ and 0.5 mg/dm$^2$ or less.

3: Transfer was not able to be visually confirmed, and the transfer amount was greater than 0.5 mg/dm$^2$ and 5 mg/dm$^2$ or less.

2: Transferred materials were able to be partially visually confirmed.

1: Transferred materials were able to be visually confirmed over the entire surface.

<Evaluation of Image Quality>

In each example and each comparative example, a polyester film FE2001 (resin base material, polyethylene terephthalate (PET), manufactured by Futamura Chemical Co., Ltd., thickness of 25 μm) serving as an impermeable medium was coated with the pretreatment liquid listed in Table 1 at approximately 1.7 g/m$^2$ using a wire bar coater and dried at 50° C. for 2 seconds. Thereafter, the character (Unicode: U+9DF9) shown in FIG. 2 was output in 2 pt, 3 pt, 4 pt, and 5 pt under the following image recording conditions using the magenta ink and the cyan ink described above, and the image quality was evaluated based on the following evaluation standards. pt indicates the desktop publishing point (DTP) representing the font size, and 1 pt is 1/72 inch. The evaluation results are listed in Table 1.

[Image Recording Conditions]

Head: A head in which four colors of 1200 dpi (dot per inch, 1 inch indicates 2.54 cm)/20-inch width piezo full line heads were disposed was used.

Jet liquid droplet amount: Each amount was set to 2.4 pL.

Driving frequency: 30 kHz (base material transport speed of 635 mm/sec)

—Evaluation Standards—

5: 2 pt characters were able to be reproduced.

4: 3 pt characters were able to be reproduced, but 2 pt characters were not able to be reproduced.

3: 4 pt characters were able to be reproduced, but 3 pt characters were not able to be reproduced.

2: 5 pt characters were able to be reproduced, but 4 pt characters were not able to be reproduced.

1: 5 pt characters were not able to be reproduced.

Figure 2:
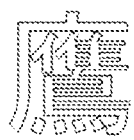
FIG. 2 is a view conceptually showing characters in character images used for evaluating the image quality in examples.
Figure 2:
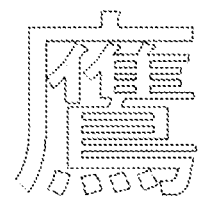
Figure 2:
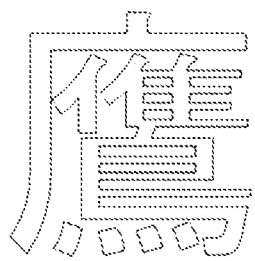
Figure 2:
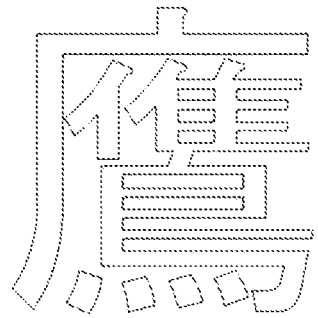
Figure 3:
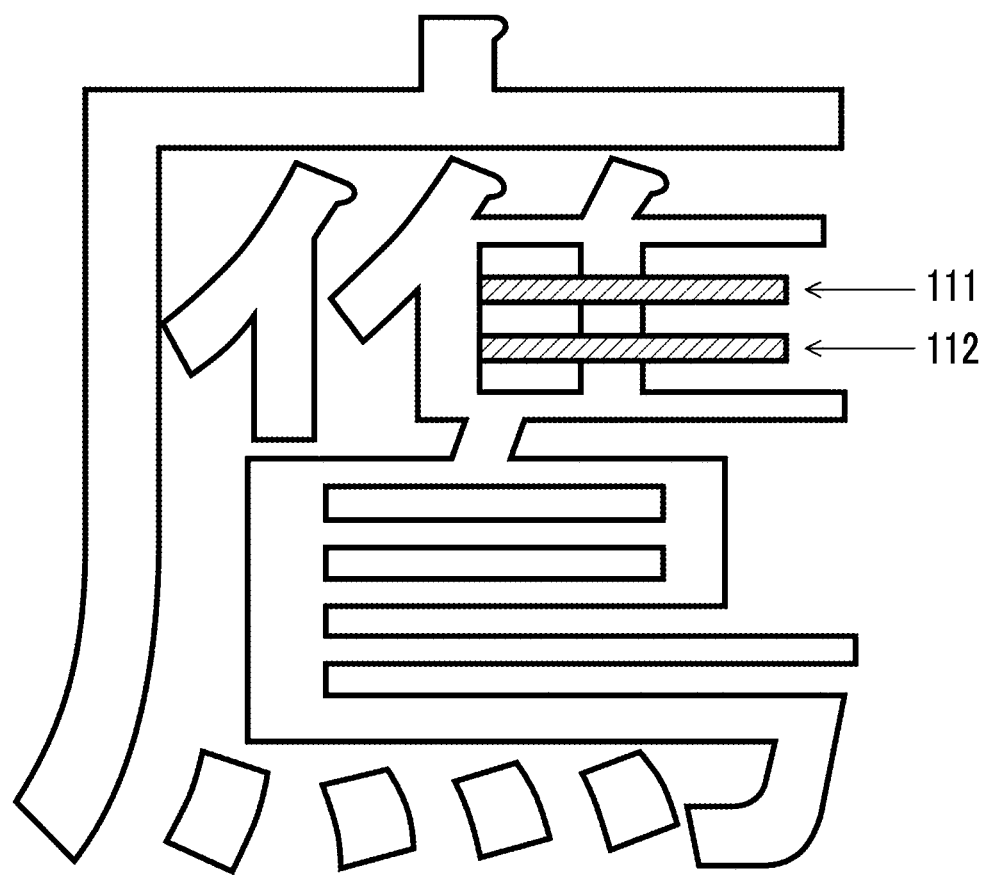
FIG. 3 is a view for describing the details of the evaluation standards for the image quality in examples.

Further, the expression "able to be reproduced" means that the horizontal line indicated by the reference numeral 11 shown in FIG. 3 and the horizontal line indicated by the reference numeral 12 shown in FIG. 3 in the characters shown in FIG. 2 were separately recorded in a case where the characters were visually confirmed from a place separated by 0.5 m.

<Evaluation of Storage Stability>

25 g of the pretreatment liquid obtained in the above-described manner was put in a 30 ml polyethylene bottle. Next, the polyethylene bottle was stored in a constant-temperature tank at a set temperature of 50° C. for 2 weeks.

The viscosity of the pretreatment liquid was measured before and after the storage, and the Δ viscosity was calculated according to the following equation.

$$\Delta \text{ viscosity (\%)} = ((\text{viscosity of pretreatment liquid after storage at } 50° \text{C. for 2 weeks}) - (\text{viscosity of pretreatment liquid before storage})) \times 100 / (\text{viscosity of ink before storage})$$

The viscosity was measured using a VISCOMETER TV-22 (manufactured by TOKI SANGYO CO., LTD.) under a condition of a pretreatment liquid temperature of 25° C.

Based on the obtained Δ viscosity, the storage stability was evaluated based on the following evaluation standards.

In a case where the Δ viscosity decreases, this indicates that the storage stability of the pretreatment liquid is excellent. Further, the storage stability of the pretreatment liquid is degraded as the Δ viscosity increases.

—Evaluation Standards—

5: Δ viscosity≤5%

4: 5%<Δ viscosity≤10%

3: 10%<viscosity≤15%

2: 15%<Δ viscosity≤25%

1: 25%<Δ viscosity

TABLE 1

| | Organic acid | | | | | Resin | | | | | | |
|---|---|---|---|---|---|---|---|---|---|---|---|---|
| | Type | 1 + m + n | m | 1 + n | pKa | Amount (% by mass) | Type | Ionic group | Amount (% by mass) | Resin/ organic acid | pH | Image quality | Transfer | Storage stability |
| Example 1 | Glutaric acid | 3 | 0 | 3 | 4.3 | 3.1 | A615GE | Sulfonate | 6.0 | 1.9 | 2.6 | 5 | 5 | 5 |
| Example 2 | Glutaric acid | 3 | 0 | 3 | 4.3 | 3.1 | A615GE | Sulfonate | 5.0 | 1.6 | 2.6 | 5 | 5 | 5 |
| Example 3 | Glutaric acid | 3 | 0 | 3 | 4.3 | 3.1 | A615GE | Sulfonate | 9.0 | 2.9 | 2.6 | 4 | 5 | 5 |
| Example 4 | Glutaric acid | 3 | 0 | 3 | 4.3 | 3.1 | A615GE | Sulfonate | 11.5 | 3.7 | 2.6 | 3 | 5 | 5 |
| Example 5 | Pimelic acid | 5 | 0 | 5 | 4.5 | 3.1 | A615GE | Sulfonate | 6.0 | 1.9 | 2.7 | 5 | 5 | 5 |
| Example 6 | Succinic acid | 2 | 0 | 2 | 4.5 | 3.1 | A615GE | Sulfonate | 6.0 | 1.9 | 2.7 | 4 | 4 | 5 |

TABLE 1-continued

| | Organic acid | | | | | Resin | | | | | | |
|---|---|---|---|---|---|---|---|---|---|---|---|---|
| | Type | 1 + m + n | m | 1 + n | pKa | Amount (% by mass) | Type | Ionic group | Amount (% by mass) | Resin/ organic acid | pH | Image quality | Transfer | Storage stability |
| Example 7 | Succinic acid | 3 | 0 | 3 | 4.5 | 3.1 | A615GE | Sulfonate | 6.0 | 1.9 | 2.7 | 4 | 4 | 5 |
| Example 8 | 1,2,3-propanetri-carboxylic acid | 3 | 0 | 3 | 3.5 | 3.1 | A615GE | Sulfonate | 6.0 | 1.9 | 2.0 | 5 | 4 | 4 |
| Example 9 | 1,3-acetonedi-carboxylic acid | 3 | 1 | 2 | 2.5 | 3.1 | A615GE | Sulfonate | 6.0 | 1.9 | 1.6 | 5 | 3 | 3 |
| Example 10 | Glutaric acid | 3 | 0 | 3 | 4.3 | 3.1 | SF300 | — | 6.0 | 1.9 | 2.6 | 5 | 4 | 5 |
| Example 11 | Glutaric acid | 3 | 0 | 3 | 4.3 | 3.1 | A-1 | Sulfonate | 6.0 | 1.9 | 2.6 | 5 | 3 | 5 |
| Comparative Example 1 | Malonic acid | 1 | 0 | 1 | 2.8 | 3.1 | A615GE | Sulfonate | 6.0 | 1.9 | 1.9 | 5 | 2 | 2 |
| Comparative Example 2 | Glutaric acid | 3 | 0 | 3 | 4.3 | 3.1 | A615GE | Sulfonate | 12.4 | 4.0 | 2.6 | 2 | 5 | 5 |
| Comparative Example 3 | Succinic acid | 2 | 0 | 2 | 4.5 | 3.1 | A615GE | Sulfonate | 12.4 | 4.0 | 2.5 | 2 | 5 | 5 |

In Table 1, the amount (% by mass) of each component to be added indicates the amount of the solid content of each component. Further, the ratio between the content of the resin and the content of the organic acid is on a mass basis.

In Table 1, "-" indicates that the corresponding component is not contained. Further, the details of the abbreviations listed in Table 1 are as follows.

A615GE: PESRESIN A615GE (manufactured by Takamatsu Oil & Fat Co., Ltd., composite particles of polyester resin and acrylic resin, volume average particle diameter of 40 nm)

A-1: water-soluble resin (acrylic resin) obtained by the following synthesis method SF300: SUPERFLEX 300 (manufactured by DKS Co., Ltd., polyurethane resin, volume average particle diameter of 15 nm)

(Synthesis of A-1)

1.5 g of sodium dodecyl benzene sulfonate (62 mass % aqueous solution, manufactured by Tokyo Chemical Industry Co., Ltd.) and 310 g of water were added to a 1000 ml three-neck flask provided with a stirrer and a cooling pipe, and the solution was heated to 90° C. in a nitrogen atmosphere. A solution A obtained by dissolving 79.7 g of a 50 mass % aqueous solution of 2-acrylamido-2-methyl-1-propanesulfonic acid sodium salt (AMPSA-Na) (manufactured by Sigma-Aldrich Co., LLC) in 20 g of water, a solution B obtained by mixing 6.9 g of hydroxyethylacrylamide (HEAA; manufactured by Fujifilm Wako Pure Chemical Corporation) with 15.4 g of styrene (St; manufactured by Fujifilm Wako Pure Chemical Corporation), and a solution C obtained by dissolving 6.0 g of sodium persulfate (manufactured by Fujifilm Wako Pure Chemical Corporation) in 40 g of water were simultaneously added dropwise to the heated mixed solution in the three-neck flask for 3 hours. After the completion of the dropwise addition, the solution was allowed to further react for 3 hours, thereby synthesizing 410 g of an aqueous solution of a water-soluble resin A-1 (amount of solid content of water-soluble resin: 10% by mass).

The weight-average molecular weight of the water-soluble resin A-1 was 15000.

As shown in Table 1, in each example in which the ratio of the content of the resin to the content of the organic acid was greater than 0 and less than 4 on a mass basis and the organic acid was a compound represented by Formula 1, all the image quality, the transfer of the components, and the storage stability were excellent.

Among the examples, in Examples 1 to 5 in which l+m+n is 3 to 5, occurrence of the transfer was further suppressed as compared with Example 6 in which l+m+n is 2.

In Examples 1 to 5 in which m in Formula 1 represents 0 and $R_1$ to $R_4$ represent a hydrogen atom, the transfer of the components and the storage stability were more excellent as compared with Examples 8 and 9 in which m represents 1 or none of $R_1$ to $R_4$ represents a hydrogen atom.

In Examples 1 to 7 in which the pKa was in a range of 4.0 to 5.0, the storage stability was more excellent as compared with Examples 8 and 9 in which the pKa was less than 4.0.

In Example 1 in which the resin had a particulate form, the transfer of the components was more excellent as compared with Example 11 in which the resin did not have a particulate form.

In Example 1 in which the resin contained a sulfonic acid group serving as an anionic group, the transfer of the component was more excellent as compared with Example 10 in which the resin did not contain an anionic group.

In Examples 1 to 8, 10, and 11 in which the pH of the pretreatment liquid was in a range of 2 to 3, the transfer of the components and the storage stability were excellent as compared with Example 9.

Meanwhile, in Comparative Example 1 in which the resin does not correspond to Formula 1, the transfer of the components and the storage stability were poor. In Comparative Examples 2 and 3 in which the ratio of the content of the resin to the content of the organic acid was 4 or greater on a mass basis, the image quality was poor.

EXPLANATION OF REFERENCES

11: supply unit
12: pretreatment liquid application unit
13: pretreatment liquid drying zone
14: ink jetting unit
15: ink drying zone
16: accumulation unit
20: anilox roller
22: coating roller
24: opposing roller
30K, 30C, 30M, 30Y, 30A, 30B: ink jet head
41, 42, 43, 44, 45, 46: transport roller
111: 11th stroke
112: 12th stroke

What is claimed is:

1. A pretreatment liquid for an impermeable medium, comprising:
water;
a resin; and
an organic acid,
wherein a ratio of a content of the resin to a content of the organic acid is greater than 0 and less than 4 on a mass basis, and
the organic acid is a compound represented by Formula 1,

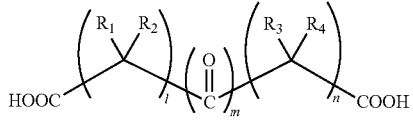

Formula 1 in Formula 1, l represents 1 or greater, m represents 0 or 1, and n represents 1 or greater, and $R_1$, $R_2$, $R_3$, and $R_4$ each independently represent a hydrogen atom, a hydroxyl group, a carboxy group, an amino group, or an alkyl group having 1 to 4 carbon atoms, wherein the resin has a glass transition temperature lower than 60° C. and a contact angle of 25° to 45°.

2. The pretreatment liquid for an impermeable medium according to claim 1,
wherein the organic acid is at least one selected from the group consisting of succinic acid, methylsuccinic acid, dimethylsuccinic acid, oxalacetic acid, malic acid, tartaric acid, glutaric acid, citric acid, 1,2,3-propanetricarboxylic acid, 1,3-acetonedicarboxylic acid, methylglutaric acid, dimethylglutaric acid, 2-oxoglutaric acid, adipic acid, butane-1,2,3,4-tetracarboxylic acid, pimelic acid, 1,3,5-pentanetricarboxylic acid, and 4-oxooctanedioic acid.

3. The pretreatment liquid for an impermeable medium according to claim 1,
wherein in Formula 1, l+m+n is 3 to 5.

4. The pretreatment liquid for an impermeable medium according to claim 1,
wherein m in Formula 1 represents 0, and
$R_1$, $R_2$, $R_3$, and $R_4$ represent a hydrogen atom.

5. The pretreatment liquid for an impermeable medium according to claim 1,
wherein the organic acid has a pKa of 4.0 to 6.0.

6. The pretreatment liquid for an impermeable medium according to claim 1,
wherein the resin has a particulate form.

7. The pretreatment liquid for an impermeable medium according to claim 1,
wherein the resin contains an anionic group.

8. The pretreatment liquid for an impermeable medium according to claim 7,
wherein the anionic group is a sulfonic acid group or a sulfonate.

9. The pretreatment liquid for an impermeable medium according to claim 1,
wherein the pretreatment liquid for an impermeable medium has a pH of 2 to 4.

10. The pretreatment liquid for an impermeable medium according claim 1,
wherein the ratio of the content of the resin to the content of the organic acid is less than 2 on a mass basis.

11. The pretreatment liquid for an impermeable medium according to claim 1,
wherein the organic acid is at least one selected from the group consisting of succinic acid, methylsuccinic acid, dimethylsuccinic acid, oxalacetic acid, tartaric acid, glutaric acid, citric acid, 1,3-acetonedicarboxylic acid, methylglutaric acid, dimethylglutaric acid, 2-oxoglutaric acid, adipic acid, butane-1,2,3,4-tetracarboxylic acid, pimelic acid, 1,3,5-pentanetricarboxylic acid, and 4-oxooctanedioic acid, and
the content of the resin is 50% by mass or greater to a total mass of the pretreatment liquid.

12. The pretreatment liquid for an impermeable medium according to claim 1,
wherein the organic acid is at least one selected from the group consisting of oxalacetic acid, tartaric acid, 1,3-acetonedicarboxylic acid, methylglutaric acid, dimethylglutaric acid, 2-oxoglutaric acid, adipic acid, butane-1,2,3,4-tetracarboxylic acid, pimelic acid, 1,3,5-pentanetricarboxylic acid, and 4-oxooctanedioic acid.

13. A base material for image recording, comprising:
an impermeable medium,
wherein a resin and an organic acid which is a compound represented by Formula 1 are provided on the impermeable medium, and a ratio of a content of the resin to a content of the organic acid is greater than 0 and less than 4 on a mass basis,

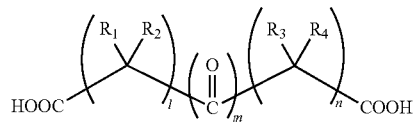

Formula 1 in Formula 1, l represents 1 or greater, m represents 0 or 1, and n represents 1 or greater, and $R_1$, $R_2$, $R_3$, and $R_4$ each independently represent a hydrogen atom, a hydroxyl group, a carboxy group, an amino group, or an alkyl group having 1 to 4 carbon atoms, wherein the resin has a glass transition temperature lower than 60° C. and a contact angle of 25° to 45°.

14. The base material for image recording according to claim 13,
wherein the organic acid is at least one selected from the group consisting of succinic acid, methylsuccinic acid, dimethylsuccinic acid, oxalacetic acid, tartaric acid, citric acid, 1,3-acetonedicarboxylic acid, methylglutaric acid, dimethylglutaric acid, 2-oxoglutaric acid, adipic acid, butane-1,2,3,4-tetracarboxylic acid, pimelic acid, 1,3,5-pentanetricarboxylic acid, and 4-oxooctanedioic acid, and
the resin contains a sulfonic acid group or a sulfonate.

15. The base material for image recording according to claim 13,
wherein the organic acid is at least one selected from the group consisting of oxalacetic acid, tartaric acid, 1,3-acetonedicarboxylic acid, methylglutaric acid, dimethylglutaric acid, 2-oxoglutaric acid, adipic acid, butane-1,2,3,4-tetracarboxylic acid, pimelic acid, 1,3,5-pentanetricarboxylic acid, and 4-oxooctanedioic acid.

16. A method of producing a base material for image recording, comprising:
applying the pretreatment liquid for an impermeable medium according to claim 1 onto an impermeable medium.

17. An image recording method comprising:
applying the pretreatment liquid for an impermeable medium according to claim 1 onto an impermeable medium; and
allowing an ink composition containing a colorant and water to be jetted, by an ink jet method, onto a surface of the impermeable medium onto which the pretreatment liquid for an impermeable medium has been applied and recording an image.

18. An image recording method comprising:
allowing an ink composition containing a colorant and water to be jetted, by an ink jet method, onto a surface of the base material for image recording according to claim 13, which includes the resin and the organic acid, and recording an image.

19. An ink set comprising:
an ink composition containing a colorant and water; and
the pretreatment liquid for an impermeable medium according to claim 1.

20. A pretreatment liquid for an impermeable medium, comprising:
water;
a resin; and
an organic acid,
wherein a ratio of a content of the resin to a content of the organic acid is greater than 0 and less than 4 on a mass basis, and
the organic acid is a compound represented by Formula 1,

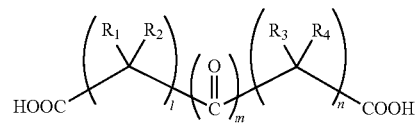

Formula 1 in Formula 1, 1 represents 1 or greater, m represents 0 or 1, and n represents 1 or greater, and $R_1$, $R_2$, $R_3$, and $R_4$ each independently represent a hydrogen atom, a hydroxyl group, a carboxy group, an amino group, or an alkyl group having 1 to 4 carbon atoms, wherein the resin has a contact angle of 25° to 45°.

* * * * *